(12) United States Patent
Varanasi et al.

(10) Patent No.: US 12,511,356 B2
(45) Date of Patent: Dec. 30, 2025

(54) SECURE ARTIFICIAL INTELLIGENCE (SAI) SYSTEM

(71) Applicant: Avaulti, Inc., Austin, TX (US)

(72) Inventors: Theresa Varanasi, Singapore (SG); Sai Varanasi, Singapore (SG)

(73) Assignee: AVAULTI INC., Austin, TX (US)

( * ) Notice: Subject to any disclaimer, the term of this patent is extended or adjusted under 35 U.S.C. 154(b) by 0 days.

(21) Appl. No.: 18/672,661

(22) Filed: May 23, 2024

(65) Prior Publication Data

US 2024/0427858 A1   Dec. 26, 2024

Related U.S. Application Data

(60) Provisional application No. 63/510,292, filed on Jun. 26, 2023.

(51) Int. Cl.
*G06F 21/31* (2013.01)

(52) U.S. Cl.
CPC .................................. *G06F 21/31* (2013.01)

(58) Field of Classification Search
CPC ....................................................... G06F 21/31
See application file for complete search history.

(56) References Cited

U.S. PATENT DOCUMENTS

| | | | |
|---|---|---|---|
| 8,650,389 B1 * | 2/2014 | Thornewell | H04L 69/40 713/168 |
| 8,797,856 B1 * | 8/2014 | Ballal | H04L 41/0659 370/242 |
| 11,023,516 B2 * | 6/2021 | Kerr | G06F 16/335 |
| 11,947,403 B1 * | 4/2024 | Rupe | G06F 1/3246 |
| 12,086,290 B2 * | 9/2024 | Nimmagadda | H04L 9/50 |
| 12,316,673 B1 * | 5/2025 | Saalfeld | H04L 63/166 |
| 2008/0046627 A1 * | 2/2008 | Castro | G06F 13/4031 710/313 |
| 2010/0202320 A1 * | 8/2010 | Bennett | H04W 84/18 370/254 |
| 2015/0154495 A1 * | 6/2015 | Qiu | G06N 5/048 706/14 |
| 2015/0187034 A1 * | 7/2015 | Mullen | G16H 30/20 235/494 |

(Continued)

*Primary Examiner* — Aravind K Moorthy
(74) *Attorney, Agent, or Firm* — Kilpatrick Townsend & Stockton LLP

(57) ABSTRACT

A device including a public subsystem comprising a first processor set of processors and a first memory set of memories storing first instructions for a first operating system. The device including a private subsystem comprising a second processor set of processors and a second memory set of memories storing second instructions for a second operating system. The device including a first interface communicatively coupled with the public subsystem and a second interface communicatively coupled with the private subsystem, each interface configured to interconnect the subsystems. The public subsystem configured to present information on a display and connect with a network. The private subsystem configured to present information on the display, incapable of connecting with the network, and configured to receive, from the public subsystem via the second interface, artificial intelligence data and execute, locally by the second processor set, an artificial intelligence model based on the artificial intelligence data.

22 Claims, 10 Drawing Sheets

(56) References Cited

U.S. PATENT DOCUMENTS

| | | | |
|---|---|---|---|
| 2020/0067906 A1* | 2/2020 | Florez | H04L 63/0815 |
| 2020/0213355 A1* | 7/2020 | Ogan | H04L 63/1466 |
| 2020/0311273 A1* | 10/2020 | Knox | G06N 5/02 |
| 2020/0320209 A1* | 10/2020 | Cohen | G06F 21/629 |
| 2021/0026722 A1* | 1/2021 | Bhatia | G06F 11/079 |
| 2021/0194983 A1* | 6/2021 | Rouse | H04L 67/60 |
| 2021/0243639 A1* | 8/2021 | Sanaullah | H04B 17/327 |
| 2021/0248163 A1* | 8/2021 | Cho | G06F 16/5846 |
| 2022/0011980 A1* | 1/2022 | Lai | G06F 3/0659 |
| 2022/0060455 A1* | 2/2022 | Rosenstein | H04L 9/0894 |
| 2022/0066895 A1* | 3/2022 | Itkin | G06F 21/606 |
| 2022/0076079 A1* | 3/2022 | Cmielowski | G06F 9/541 |
| 2022/0114579 A1* | 4/2022 | Beck | H04L 9/0897 |
| 2022/0172256 A1* | 6/2022 | D'Alessandro | G06N 20/00 |
| 2022/0197529 A1* | 6/2022 | Sealing | G06F 3/0622 |
| 2022/0355097 A1* | 11/2022 | Mech | A61N 1/36021 |
| 2022/0366354 A1* | 11/2022 | Maiman | G06Q 10/083 |
| 2023/0164158 A1* | 5/2023 | Fellows | H04L 41/147 726/23 |
| 2023/0214455 A1* | 7/2023 | Menard | G06N 3/044 706/12 |
| 2023/0319585 A1* | 10/2023 | Zhang | G06N 20/00 706/12 |
| 2023/0325203 A1* | 10/2023 | Warkentin | G06F 9/4406 713/2 |
| 2024/0086083 A1* | 3/2024 | Allen | G06F 3/0637 |
| 2024/0143499 A1* | 5/2024 | Oh | G06F 12/0246 |
| 2024/0169049 A1* | 5/2024 | Hamlin | G06F 21/44 |
| 2024/0195736 A1* | 6/2024 | Dhamal Gopalarathnam | H04L 45/745 |
| 2024/0249020 A1* | 7/2024 | Kumbhashi | G06F 21/6245 |
| 2024/0356799 A1* | 10/2024 | Connor | H04L 41/085 |
| 2024/0385884 A1* | 11/2024 | Kumar | G06F 9/5072 |
| 2025/0110865 A1* | 4/2025 | Gottiparthy | G06F 3/0631 |
| 2025/0220430 A1* | 7/2025 | Elshafie | H04W 12/106 |
| 2025/0224949 A1* | 7/2025 | Orfanos | G06F 8/65 |

\* cited by examiner

SECURE ARTIFICIAL INTELLIGENCE (SAI) SYSTEM

CROSS-REFERENCES TO RELATED APPLICATIONS

This application is a Non-Provisional Patent Application which claims priority to U.S. Provisional Application No. 63/510,292, filed Jun. 26, 2023, Singapore Provisional Application Serial No. 10202301817W, filed Jun. 26, 2023, and Singapore Non-Provisional application Serial No. 10202400276R, filed Jan. 31, 2024, the contents of which are herein incorporated by reference in their entirety for all purposes.

BACKGROUND OF THE INVENTION

Data may be used as input to software applications, such as a machine learning model (e.g., a generative model). The data may be used to train a model and/or generate output. In many existing systems, the data, model, and/or output may be shared with other users and/or systems that did not provide the data, train the model, and/or generate the output.

DETAILED DESCRIPTION OF THE INVENTION

Figure 1:
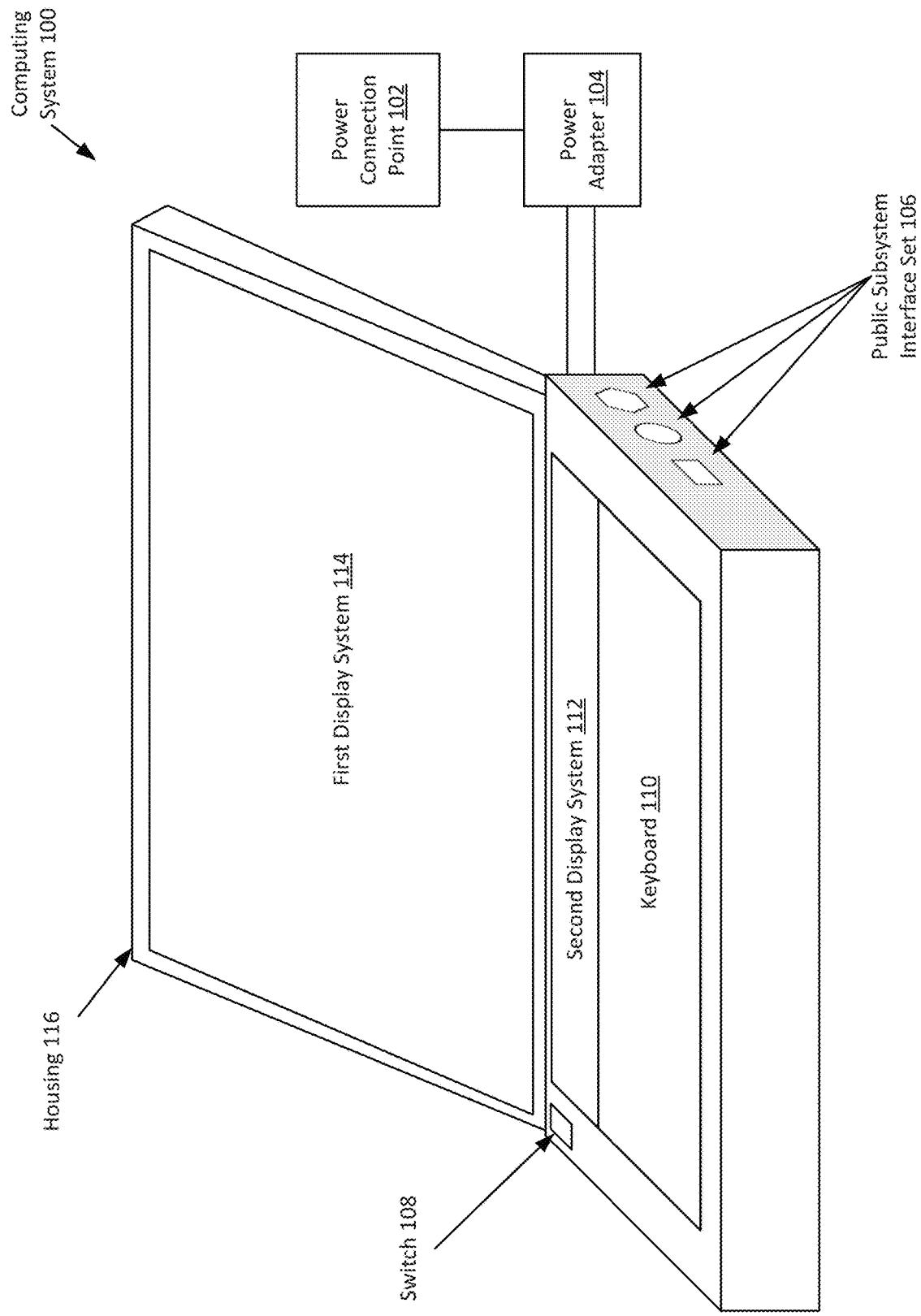
FIG. 1 illustrates an example of a computing system from a first viewing perspective, according to embodiments of the present disclosure.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure relate to techniques for improving the ability to maintain confidentiality of data, control availability of data, and improve data integrity. The embodiments include devices, methods, systems, etc. that can improve cybersecurity, and the capability to control data.

Current computing environments present a risk of information being shared inadvertently (e.g., sharing happening by design but without knowledge of a user, sharing happening due to an accident of a user, sharing caused by malicious files, etc.). In current systems, there is a risk of exposure or leakage since hardware, programs, and machine learning models may be accessible by and/or connected to a network (e.g., a public network, such as the internet). In many cases, artificial intelligence models use user input to generate model output and then retain data supplied by the user to train or continue training one or more models. Thus, user input may not be kept private and may be used to produce future output of the artificial intelligence model. Similarly, models trained by users may have been trained using data that is desired to be kept private. Accordingly, hyperparameters and hyperparameter values of such models may be based on the data desired to be kept private. Thus, a trained model may provide insights into the data used to train the model.

Current solutions may use antivirus software to increase system security, keep shared data in remote storage that is meant to be secure, completely disconnect a system from the network, or acknowledge and submit to data sharing altogether. However, these solutions do not sufficiently address the problems and/or are too limiting.

In certain embodiments, a computing system comprises: a display; a housing; a public subsystem disposed in the housing and comprising a first processor set of processors and a first memory set of memories storing first instructions for a first operating system; a private subsystem disposed in the housing and comprising a second processor set of processors and a second memory set of memories storing second instructions for a second operating system; a first interface disposed in the housing configured to interconnect the private subsystem and the public subsystem and communicatively coupled with the public subsystem; and a second interface disposed in the housing configured to interconnect the private subsystem and the public subsystem and communicatively coupled with the private subsystem; wherein: the public subsystem is configured to present information on the display and connect with a network, and the private subsystem is configured to present information on the display and is isolated such that being incapable of connecting with the network, and is configured to receive, from the public subsystem via the second interface, artificial intelligence data and execute, locally by the second processor set, an artificial intelligence model based on the artificial intelligence data.

In certain embodiments, the computing system further comprises a power adapter common to the private subsystem and the public subsystem and configured to selectively supply power to the private subsystem and the public subsystem such that only one of the private subsystem or the public subsystem receives power at a time. A first power source can be included in the public subsystem; and a second power source, different than the first power source, can be included in the private subsystem. The power adapter can further comprise: a first end configured to be coupled with the first power source; a second end configured to be coupled with the second power source; and a third end configured to be coupled with a power source other than the second power source and the first power source.

In certain embodiments, the computing system further comprises a memory storage device configured to transfer the artificial intelligence data between the public subsystem and the private subsystem via the first interface and the second interface, the memory storage device configured to be communicatively coupled with one of: (i) the first interface and (ii) the second interface at a time. The memory storage device may include two or more data channels that may send and receive a packet independently of one another; a third processor set of processors; and a third memory set of memories storing third instructions, that configure the memory storage device to: perform a user authentication; and based on the user authentication, simultaneously send and receive the packet to and from the first interface or the second interface, the packet including the artificial intelligence data.

In certain embodiments, techniques are included for receiving artificial intelligence data by a public subsystem from a network, wherein the public subsystem includes a first interface and is disposed in a housing. The techniques further including transferring, using the first interface, the artificial intelligence data to a memory storage device from the public subsystem. The techniques further including transferring, using a second interface of a private subsystem disposed in the housing and incapable of connecting with the first network, the artificial intelligence data to the private subsystem from the memory storage device. The techniques further including executing, by the private subsystem, an artificial intelligence model using the artificial intelligence data.

In certain embodiments, a device comprises a public subsystem comprising a first processor set of processors and a first memory set of memories storing first instructions for a first operating system; a private subsystem comprising a second processor set of processors and a second memory set of memories storing second instructions for a second operating system; a first interface configured to interconnect the private subsystem and the public subsystem and communicatively coupled with the public subsystem; and a second interface configured to interconnect the private subsystem and the public subsystem and communicatively coupled with the private subsystem; wherein: the public subsystem is configured to present information on a display and connect with a network, and the private subsystem is configured to present information on the display and is isolated such that being incapable of connecting with the network, and is configured to receive, from the public subsystem via the second interface, artificial intelligence data and execute, locally by the second processor set, an artificial intelligence model based on the artificial intelligence data.

Embodiments may relate to a computing system that includes a private subsystem and a public subsystem. The private subsystem may allow for computations to occur in an environment that may have more data confidentiality than compared to the public subsystem. For example, the private subsystem may not be capable of connecting to a network (e.g., the internet) and data may only be obtained from a public subsystem. The public subsystem may be capable of connecting to the network and may act as a data intermediary between the network and the private subsystem. Other embodiments use additional, or alternative, mechanisms to enhance the confidentiality, availability, and/or integrity of data stored by the private subsystem.

In certain embodiments, the public subsystem may act as a data intermediary for the private subsystem to receive and transmit artificial intelligence data from and to a network. Artificial intelligence data may include data used for performing artificial intelligence operations, such as training an artificial intelligence model, testing an artificial intelligence model, adjusting an artificial intelligence model, using an artificial intelligence model, etc. Examples of data may be images, text documents, labeled images, classifications, web pages, code, JSON files, video files, sensor information (e.g., collected from an internet of things device), etc. The private subsystem may be configured to perform artificial intelligence operations such as training artificial intelligence models, tuning artificial intelligence models, and executing artificial intelligence models. The private subsystem may be configured to operate on artificial intelligence models in an offline manner (e.g., to keep private subsystem data confidential).

FIG. 1 illustrates an example of a computing system 100 from a first viewing perspective, according to embodiments of the present disclosure.

The computing system 100 may include a power connection point 102, a power adapter 104, a switch 108, a housing 116, a first display system 114, a second display system 112, a keyboard 110, a public subsystem, and a public subsystem interface set 106.

The housing 116 may enclose the first display system 114, the second display system 112, the keyboard 110, the switch 108, other peripherals and/or the public subsystem interface set 106. In certain embodiments, the housing 116 may enclose fewer than two display systems or more than two display system. In certain embodiments, the housing 116 may enclose (e.g., partially, or completely) a private subsystem interface set.

The housing 116 may enclose the public subsystem (e.g., public subsystem 304) and/or the private subsystem (e.g., private subsystem 302). In certain embodiments, only one of the private subsystem and the public subsystem is enclosed by the housing 116. For example, the housing 116 may enclose the private subsystem and a second housing that is separate from the housing 116 enclosing the private subsystem may enclose the public subsystem. In certain embodiments, a private subsystem and a public subsystem are enclosed by the housing 116. In certain embodiments, any number of private subsystems and/or public subsystem may be enclosed by the housing 116.

The public subsystem may be communicatively coupled with the public subsystem interface set 106. The public subsystem interface set may include one or more interfaces for transmitting data (e.g., program code, training data, testing data, validation data, feature data, label data, image data, text data, audio data, video data, packet data, command data, configuration data, keyboard 110 data, and/or mouse data, etc.) to and/or from the public subsystem (e.g., a universal serial bus (USB) interface, a high definition multimedia interface (HDMI), an ethernet interface, etc.). The interfaces of the public subsystem interface set 106 may be configured to give the public subsystem the capability to access online resources and public data (e.g., network data). For example, the public subsystem may be configured to access online resources via an ethernet connection or wireless connection (e.g., Wi-Fi, Bluetooth). In certain embodiments, the public subsystem interface set 106 includes any number of interfaces for coupling peripherals (e.g., computer mice, speakers, cameras, displays, etc.) with the public subsystem. In certain embodiments, the public subsystem interface set 106 includes any number of interfaces for coupling external memory storage (e.g., a memory storage device) to the public subsystem. The public subsystem interface set 106 may include interfaces with any number of different shapes (e.g., rectangular, hexagonal, circular, etc.) used for coupling and communicating with certain types of input/output devices and/or peripherals.

In certain embodiments, at least one of the interfaces of the public subsystem interface set 106 is for mechanically coupling with a secure artificial intelligence (SAI) memory storage device. The SAI memory storage device is discussed in more detail below (e.g., FIGS. 5-6).

The public subsystem interface set 106 may be disposed on any combination of surfaces of the housing 116 (e.g., a first interface on a first surface and a second interface on a second surface that is different from the first).

The power connection point 102 may include a power source (or an interface to a power source). The power source may be capable of providing power to the power adapter 104. The power connection point 102 may include a wall outlet, a battery bank, etc. In certain embodiments, the power connection point 102 may provide data and power to the power adapter 104. For example, power and data may be provided over an ethernet cable.

The power adapter 104 may be configured to receive power from the power connection point 102. In certain embodiments, the power adapter 104 can receive data from the power connection point 102. At least a portion of the power received from the power connection point 102 may be transmitted to the private subsystem and/or the public subsystem. In certain embodiments, the power adapter 104 supplies power to one of the private subsystem and the public subsystem at a time. For example, a subsystem provided with power may include the subsystem that is in a powered ON state. In an example, the subsystem provided with power may include the subsystem that has the lowest amount of remaining stored power below a threshold power amount (e.g., regardless of a powered ON state).

In certain embodiments, the private subsystem and the public subsystem are provided power from the power adapter 104 at the same time. For example, the amount of power supplied by the power connection point 102 to the power adapter 104 may be split (e.g., in half or based on a different ratio) between the private subsystem and the public subsystem.

In certain embodiments, the power adapter 104 provides power to at least one of the private subsystem and the public subsystem when the power adapter 104 is mechanically connected to each of the private subsystem and the public subsystem and otherwise does not power either subsystem when a mechanical coupling between the power adapter 104 and each of the public subsystem and the private subsystem is not made.

In certain embodiments, the power adapter 104 can transmit and/or receive power and/or data. The data that may be transmitted and/or received by the power adapter 104 is described further below.

The power adapter 104 may be removably detachable from the housing 116 (e.g., can be plugged into and unplugged from). In certain embodiments, the power adapter 104 is fixed to the housing 116 or another component of the computing system 100.

The switch 108 may be an integrated peripheral (e.g., fixed to a component of the computing system 100 (e.g., the housing 116)). The switch 108 may be capable of causing the private subsystem or the public subsystem to enter into a powered ON state. The switch 108 may be capable of causing the private subsystem or the public subsystem to enter into a powered OFF state. The switch 108 may be capable of causing the private subsystem or the public subsystem to enter into a powered ON state and the other of the private subsystem and the public subsystem to enter into a powered OFF state. The switch 108 may include a mechanical switch 108 capable of being interacted with by a user (e.g., moved by the user's finger). In certain embodiments, the switch 108 may be a button that is configured to toggle the private subsystem into a powered ON/OFF state and the public subsystem into a powered ON/OFF state. The switch 108 may include or may be associated with conditional logic of a sensor (e.g., fingerprint scanner, facial recognition sensor, etc.) before causing a subsystem to be powered into an ON or OFF state. The switch 108 may be communicatively coupled with the private subsystem and the public subsystem. The switch 108 may be included in the computing system 100. The switch 108 may be included in the power adapter 104 and/or in the housing 116 of the device. The switch 108 may have a Single-Pole, Double Throw (SPDT) design.

In certain embodiments, the switch 108 may be capable of causing the private subsystem or the public subsystem to enter into a standby state or an active state. A subsystem may be powered ON while in the standby state. In the standby state, the components of the subsystem (e.g., the public subsystem, the private subsystem) may remain ON (e.g., to increase the computing system 100 responsiveness to the switch 108 being toggled). In the standby state, the components may remain ON but may consume less energy, perform less processing over a time period, perform a subset of functions relative to the active state, etc. In certain embodiments, one of the private subsystem and the public subsystem may be configured to enter into a standby state, and the other subsystem may be configured to enter into an active state. In certain embodiments, one of the private subsystem and the public subsystem may be configured to switch between a powered ON standby state, a powered ON active state, and a powered OFF state while the other of the private subsystem and the public subsystem may be configured to switch between a powered OFF state and a powered ON active state (no standby functionality).

In certain embodiments, when input received by the switch 108 indicates that a subsystem should be powered OFF, the respective subsystem may cause output to be presented to a user that conveys information relating to a process that may be interrupted if a power OFF occurs. For example, a data transfer may occur between the powered ON subsystem and a memory storage device (e.g., SAI device, thumb drive, etc.) and the subsystem may display a message on a user interface asking if the powering OFF is desired. In certain embodiments, the powered ON subsystem may safely terminate a process before completing the power OFF process (e.g., to prevent data from being corrupted, to allow a data transfer to safely complete, etc.).

The switch 108 may facilitate enabling input methods (e.g., integrated peripherals, peripherals), memory devices, displays, etc. to interact with a powered ON subsystem (e.g., private subsystem or public subsystem). The switch 108 may include a safety lock mechanism to decrease the likelihood of an unintended toggling of the switch 108 and thereby the active subsystem. In certain embodiments, the switch 108 is in the form of a software switch (e.g., based on instructions executed and/or stored by a system in common to the private subsystem and the public subsystem). In an example, upon bootup of the secure computing system 100, a decision may be made (e.g., using onscreen prompts and/or selections) whether to use the private subsystem or the public subsystem.

The switch 108 may cause one subsystem (e.g., the public subsystem) to be powered OFF and the other subsystem (e.g., the private subsystem) to be powered ON. Such a mechanism may allow for reducing the risk of data loss and power surges. The switch 108 may also be capable of controlling the power supplied to peripheral devices of the computing system 100.

The private subsystem may be configured to perform artificial intelligence operations (e.g., train artificial intelligence model, execute artificial intelligence models, etc.). The private subsystem may include specialized hardware and/or software for performing the artificial intelligence operations. The private subsystem may include software and/or hardware to enhance data confidentiality, integrity, and/or availability. The private subsystem is discussed in further detail herein.

The first display system 114 may be an integrated peripheral and may be used to display information regarding processed data and/or data being processed via the operating system and software. The first display system 114 may include a touchscreen. The first display system 114 may be capable of swiveling and/or pivoting on more than one axis. As illustrated, the first display system 114 may be a display system that is integrated into the computing system 100. In certain embodiments, the first display system 114 and/or any number of other peripherals are not integrated with the computing system 100 (e.g., external display coupled with the computing system 100).

The first display system 114 and/or any other display system may be used to display information about a status of operations of artificial intelligence models other status of operations information about other software running on the computing system 100. Such information may allow a user of the computing system 100 to monitor the operations of the software. The information may allow the user of the computing system 100 to perform corrections to the software to cause the software to perform in a different manner. For example, an artificial intelligence model may be learning in an undesired way or using improper weighting. The first display system 114 may allow the user to observe how an artificial intelligence model is being built and how the model logic is executing. This transparency may allow the user to interrupt and redirect the artificial intelligence model as required.

The first display system 114 or other peripherals of the computing system 100 may be used to address the so-called "black box" problem in artificial intelligence where the decision-making process is opaque to the user. For example, by allowing users to understand which artificial intelligence model is active and the logic being used by the model when making decisions, a level of transparency may be brought to artificial intelligence and may assist in improving model performance (e.g., upon learning iterations). The decision-making process and artificial intelligence model structure may be monitored in real time using one or more peripherals of the computing system 100.

Through the use of the first display system 114 and/or user feedback regarding one or more artificial intelligence model(s), the time to obtain desired results (e.g., training a model) can be reduced. Additionally, the chances of artificial intelligence hallucinations can be reduced. The user may be allowed to interact with visually represented portions of an artificial intelligence model (e.g., pathways, neurons, weights, decisions trees, complex data, processes, past performance, past decisions, debug, trends, explanations, etc.) to trigger detailed information of selected elements. Such data may be capable of being logged and then transferred to other computing systems (e.g., a private subsystem, a public subsystem, a network) for further analysis, use, etc. The first display system 114 and/or other output interfaces may enable a user to view data (e.g., artificial intelligence models, training data sets, etc.) and/or find data (e.g., using a database interface or data marketplace).

In an embodiment, before presenting information using a peripheral, the computing system 100 may perform authentication. The authentication may confirm that a user is authenticated for using the system, that another unauthenticated user is not nearby, etc. Authentication of a user may be performed using any number of peripherals of the computing system 100 (e.g., password entered into a keyboard 110, secret swipe gesture performed on a touchscreen, biometric authentication, etc.). The authentication requirements may be based on which of the private subsystem or the private subsystem is in a powered ON state.

In an embodiment, a peripheral of the computing system 100 is capable of displaying the battery status of at least one of a public subsystem or a private subsystem. In certain embodiments, the battery status of a subsystem not in use (e.g., OFF state) may be displayed even when the other subsystem is in use (ON state).

The computing system 100 may include the second display system 112. The second display system 112 may be in addition to the first display system 114. There may be any number of other display systems in addition to the first display system 114. The second display system 112 and any other display system may perform any of the functions described above with respect to the first display system 114, and may be in addition to or as an alternative to the first display system 114 performing the functions.

The computing system 100 may include any number (e.g., zero or more) of peripherals in an integrated peripherals set. For example, the peripherals may include the first display system 114 and/or any other display systems. The peripherals may include keyboard 110. The peripherals may include any number of other peripherals alone, or in combination to any other possible peripherals (e.g., light emitting diodes (LEDs), integrated keyboards, external keyboards, speakers, microphones, cameras, sensors (e.g., biometric sensor (e.g., fingerprint scanner)), etc.

Peripherals included in the computing system 100 may be integrated into the housing 116 (e.g., not removably couplable, fixed, integrated keyboard) or may be external to the computing system 100 (e.g., removably couplable, wireless keyboard).

The computing system 100 may be configured to use peripherals to receive user input and/or receive input from a system (e.g., Bluetooth signal) or an environment (e.g., optical sensor). The computing system 100 may be configured to present information (e.g., on a display, via a speaker, via a light, via a vibration, etc.)

Peripherals may be configured to output battery status(es) and other statuses (e.g., alerts, activated subsystem (e.g., public subsystem or private subsystem), artificial intelligence model information, hardware information, representations of data, etc.) of the active subsystem. In an example, backlights of a keyboard 110 (e.g., color or backlight) or light emitted by another peripheral may correspond to the active subsystem, battery status, operations being performed, etc.

Figure 2:
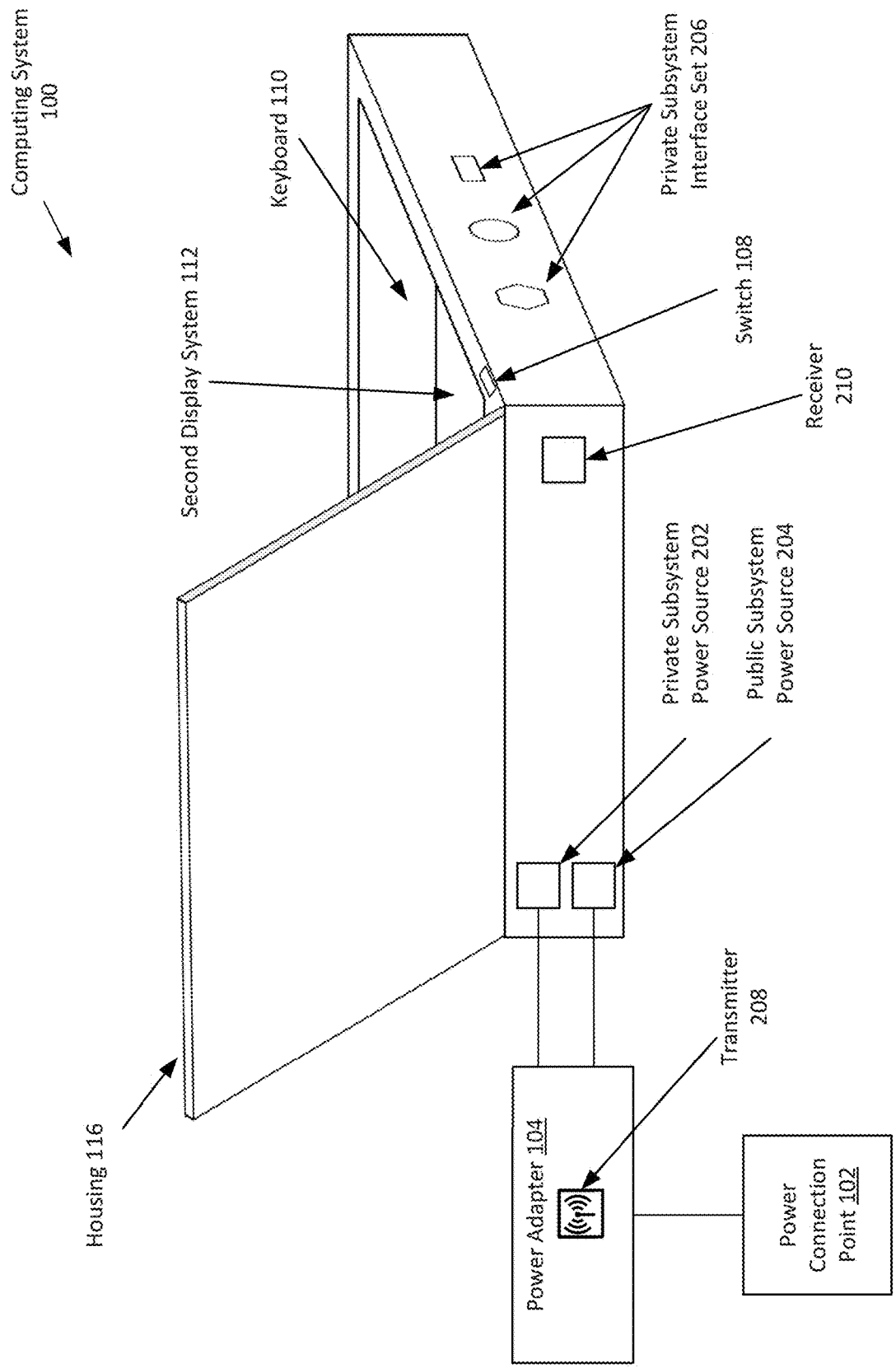
FIG. 2 illustrates an example of a computing system from a second viewing perspective, according to embodiments of the present disclosure.

FIG. 2 illustrates an example of a computing system 100 from a second viewing perspective, according to embodiments of the present disclosure.

The computing system 100 may include the power connection point 102, the power adapter 104, the switch 108, the housing 116, the first display system 114, the second display system 112, the keyboard 110, the private subsystem, a private subsystem power source 202, a public subsystem power source 204, a receiver 210, and a private subsystem interface set 206.

Any of the power connection point 102, the power adapter 104, the switch 108, the housing 116, the first display system 114, the second display system 112, and/or the keyboard 110, may function as described herein with respect to the computing system 100.

The power adapter 104 may be configured to be communicatively coupled, wirelessly or wired, with at least one of the private subsystem or the public subsystem (e.g., via the receiver 210). In certain embodiments, the power adapter 104 includes a transmitter 208 that transmits (e.g., broadcasts) a signal (e.g., RFID) to be received by the receiver 210. The receiver 210 may be communicatively coupled with at least one of the private subsystem or the public subsystem. The receiver 210 may include a sensor (e.g., RFID reader). In certain embodiments, the receiver 210 is implemented by a set of processors of the second computing system 100. The signal received (e.g., via a wired connection) from the power adapter 104 may be processed by the set of processors. The receiver 210 may determine whether a received signal can be authenticated. For example, the power adapter 104 may transmit (e.g., via a wired connection and/or a wireless connection) a signal to the receiver 210 that identifies the power adapter 104.

The transmitter 208 may transmit the signal based on a power adapter 104 identifier specific to the power adapter 104 (e.g., unique to the manufacturer of the power adapter 104, unique to the owner of the power adapter 104, unique to the power adapter 104, etc.), which allows the receiver 210 to determine if the power adapter 104 is authenticated for use with the public subsystem and/or the private subsystem. In certain embodiments, if the power adapter 104 is not authenticated for use with the public subsystem and/or the private subsystem, then power and/or data is not transmitted between the power adapter 104 and the private subsystem and/or the public subsystem. Such a configuration may allow for a determination to be made as to whether the power adapter 104 is authenticated to provide power to, and/or transmit and/or receive data to/from the public subsystem and/or the private subsystem. The authentication of the power adapter 104 may increase system security and decrease the attack vector for attacks and/or monitoring of the computing system 100 (e.g., monitoring the private subsystem of the computing system 100).

In certain embodiments, the transmitter 208 transmits the signal to the receiver 210 wirelessly (e.g., RFID). In certain embodiments, the transmitter 208 transmits the signal to the receiver 210 via the wired connection between the power adapter 104 and the housing 116 (e.g., the wired connection to the private subsystem power source 202 and/or the public subsystem power source 204).

In certain embodiments, the signal includes a signature related to the power adapter 104 or other information stored by the power adapter 104. In certain embodiments, the signal transmitted by the transmitter 208 is capable of being used to determine that the power adapter 104 has been tampered with, is on an allow list of power adapters, is made by a certain manufacturer, is owned by a particular person or entity, etc. For example, an identifier of the power adapter 104 stored in memory of the power adapter 104 may have been changed and therefore the system 100 may be capable of determining that the power adapter 104 memory has been tampered with or that the power adapter 104 is made by an authorized power adapter 104 manufacturer. For example, the power adapter 104 may include components capable of determining if tampering has occurred.

In certain embodiments, the power adapter 104 includes a receiver 210 (e.g., wired, wireless). In certain embodiments, the housing 116, private subsystem, and/or public subsystem include a transmitter 208 (e.g., wired, wireless) configured to transmit a signal to the receiver 210 of the power source. The power source may be configured to receive signals from the transmitter 208 of the housing 116, private subsystem, and/or public subsystem that indicates whether power is needed (e.g., to charge the private subsystem power source 202), where power is needed (e.g., the private subsystem or the public subsystem power source 204), and/or whether the power adapter 104 has been authenticated.

The power adapter 104 may include a faraday cage so that electromagnetic signals internal to the power adapter 104 have a reduced likelihood of being capable of being picked up by a device external to the power adapter 104. The faraday cage may also prevent external electromagnetic signals from interfering with operations of the power adapter 104.

The power supplied by the wires connecting the power adapter 104 to the private subsystem power source 202 and the public subsystem power source 204 may be produced by independent power sources within the power adapter 104. The independent power sources may maintain a steady voltage to the public subsystem and the private subsystem independently of one another and irrespective of fluctuations in the power connection point 102. Each power source may be housed within a thermally insulated compartment, preventing heat transfer between the power source and other components.

The private subsystem power source 202 and the public subsystem power source 204 may be capable of receiving power from the power adapter 104.

The private subsystem power source 202 may be configured to receive power and/or data from the power adapter 104. The private subsystem power source 202 may be configured to store power received from the power adapter 104. For example, the private subsystem power source 202 may act as a battery and be capable of receiving power, storing the power, and discharging the stored power.

The private subsystem power source 202 may be included in the private subsystem and be capable of providing power to the private subsystem. The private subsystem power source 202 may transmit data received from the power adapter 104 to the receiver 210. In certain embodiments, the private subsystem power source 202 is configured to transmit data to the power adapter 104. For example, the private subsystem power source 202 may exchange cryptographic key data with the power adapter 104 and/or instruct the power adapter 104 to provide or not provide power to the private subsystem (or public subsystem).

The public subsystem power source 204 may function like the private subsystem power source 202. The public subsystem power source 204 may be coupled to the public subsystem and may be capable of providing power to the public subsystem.

In certain embodiments, the private subsystem and the public subsystem have a single power source that is commonly shared between the two subsystems. The shared power source may be included in a common subsystem. In such an embodiment, the power adapter 104 may include a first end coupled to the power connection point 102 and a second end coupled to the housing 116.

The private subsystem interface set 206 may be in addition to or as an alternative to the public subsystem interface set 106. The private subsystem interface set 206 may be communicatively coupled with the private subsystem. The private subsystem interface set 206 may be included in the housing 116. The private subsystem interface set 206 may include one or more interfaces for transmitting data to and/or from the private subsystem (e.g., USB, HDMI, ethernet, SAI interface, etc.).

In certain embodiments, the interfaces of the private subsystem may be configured to give the private subsystem the capability to access online resources and public data (e.g., network data). For example, the private subsystem may be configured to access online resources via an ethernet connection or wireless connection (e.g., Wi-Fi, Bluetooth). The interfaces of the private subsystem may not include any interfaces capable of interfacing with a network (e.g., no Wi-Fi interface, no Bluetooth interface, no ethernet interface). The interfaces of the private subsystem may enable limited communication with a network (e.g., small and/or relatively slow data transfers) between the private subsystem and a network device), such as the private subsystem including a Bluetooth interface but no ethernet interface. Limited network interfaces and/or connectivity of the private subsystem may enhance the ability of the computing system 100 to keep data confidential, available, and stored with integrity.

In certain embodiments, the private subsystem interface set 206 includes any number of interfaces for coupling peripherals with the private subsystem. In certain embodiments, the private subsystem interface set 206 includes any number of interfaces for coupling external memory storage (e.g., a SAI memory storage device) to the private subsystem. The private subsystem interface set 206 may include interfaces that have any number of different shapes (e.g., rectangular, hexagonal, circular, etc.) used for communicating with certain types of systems, devices, and/or peripherals.

In certain embodiments, at least one of the interfaces of the private subsystem interface set 206 is for mechanically coupling with a SAI memory storage device. The SAI memory storage device is discussed in more detail below (e.g., FIGS. 5-6).

In certain embodiments, one or more interfaces of the private subsystem interface set 206 are common to the private subsystem interface set 206 and the public subsystem interface set 106. For example, the computing system 100 may include a single audio output jack that may be shared between the private subsystem interface set 206 and the public subsystem interface set 106.

In certain embodiments, the private subsystem interface set 206 or a specific interface thereof (e.g., the SAI interface (e.g., see FIG. 5)) enables the private subsystem to send and receive data to/from other systems (e.g., network devices, router, server, etc.) that are not peripherals (e.g., mouse, keyboard 110, display, headphones, etc.).

The private subsystem interface set 206 may be disposed on any combination of surfaces of the housing 116 (e.g., a first interface on a first surface and a second interface on a second surface that is different from the first).

In certain embodiments, the housing 116 may include a storage compartment. The storage compartment may be capable of causing a memory storage device or other similar size object to be enclosed. The storage compartment may mechanically extend from and into the housing 116. The storage compartment may allow for the memory storage device to be mechanically coupled to an interface of the private subsystem interface set 206 or the public subsystem interface set 106 while in the storage compartment and may do so while the storage compartment is retracted into the housing 116.

Although the computing system 100 has been illustrated in a laptop-like form factor. The computing system 100 may be embodied in many forms. For example, the computing system 100 may be in the form of a mobile device (e.g., a tablet), a desktop device, a server rack device, etc.

Figure 3:
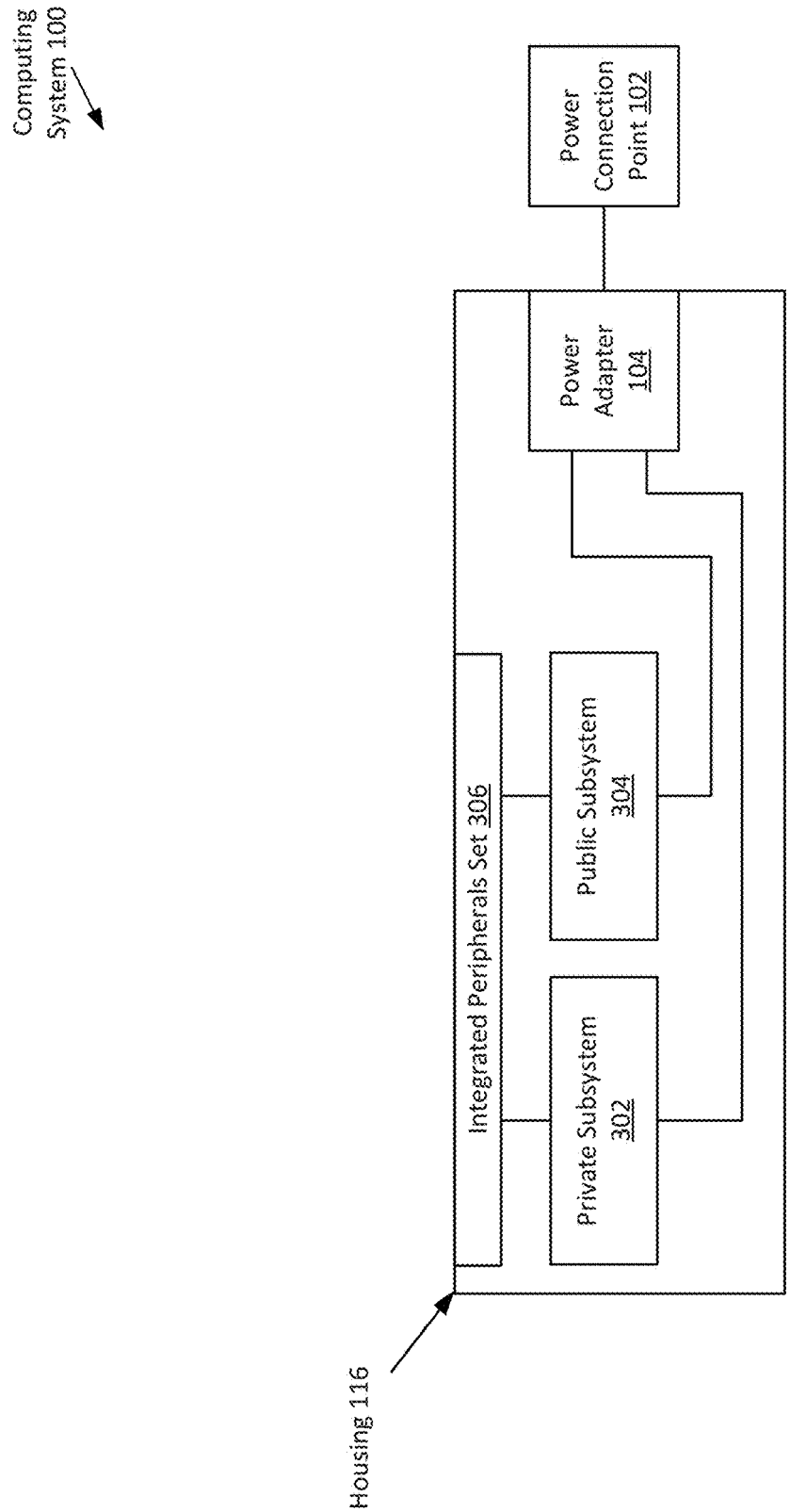
FIG. 3 illustrates an example of a computing system, according to embodiments of the present disclosure.

FIG. 3 illustrates an example of the computing system 100, according to embodiments of the present disclosure.

The computing system 100 may include an integrated peripherals set 306, the private subsystem 302, the public subsystem 304, the power adapter 104, and the power connection. The private subsystem 302, the public subsystem 304, the power adapter 104, and the power connection may perform functions as described herein. The integrated peripherals set 306 may include any number of the peripherals (e.g., the keyboard 110, the first display system 114, etc.) described herein and the peripherals may be fixed to the computing system 100.

The private subsystem 302 and the public subsystem 304 may operate completely independently or partially independently of one another. In an embodiment, the private subsystem 302 may have a cooling mechanism, power supply, operating system, and/or other components that are independent of the public subsystem 304. For example, the private subsystem 302 may run a different operating system than the public subsystem 304. In an embodiment, the private subsystem 302 runs a custom operating system built for the specific purpose of functioning with a private subsystem 302 and/or performing functions like those performed by the private subsystem 302 (e.g., artificial intelligence related operations).

The public subsystem 304 may be capable of connecting to a network (e.g., the internet, local area network, wide area network) and may access online resources and public data (e.g., network data). When the public subsystem 304 is in a powered ON state, interactions with artificial intelligence models may be connected to a network, directly or indirectly, and could be used to enhance public artificial intelligence models.

The power adapter 104 may be included in the housing 116. In certain embodiments, the private subsystem 302 and/or public subsystem 304 includes a power source. In certain embodiments, the private subsystem 302 and/or the public subsystem 304 do not include a power source that is different from the power adapter 104. In certain embodiments, the power adapter 104 may directly power the private subsystem 302 and/or the public subsystem 304. The power adapter 104 may be configured to power only one of the private subsystem 302 or the public subsystem 304 at a single time. The power adapter 104 may include a battery capable of storing power and capable of discharging the stored power. For example, the power adapter 104 may store power received from the power connection point 102 to be discharged when the power adapter 104 is not connected to the power connection point 102.

In certain embodiments, the private subsystem 302 may be disposed above and/or below the public subsystem 304 within the housing 116. In certain embodiments, the private subsystem 302 may be disposed to a side of the public subsystem 304 within the housing 116. In certain embodiments, the private subsystem 302 and the public subsystem 304 share one or more components between the subsystems. In certain embodiments, the housing 116 includes only the private subsystem 302 or only the public subsystem 304. In certain embodiments, the private subsystem 302 and/or the public subsystem 304 is a removable module from the housing 116 that includes hardware independent of the other private subsystem 302 or public subsystem 304. In certain embodiments, the housing 116 includes zero or more public subsystems 304 and/or zero or more private subsystems 302.

The integrated interfaces may include cameras, keyboards, mouse track pads, buttons, etc. that are coupled with the housing 116 non-removably and that can be used to interface with the public subsystem 304 and/or private subsystem 302. Integrated interfaces have been described in further detail herein.

Figure 4:
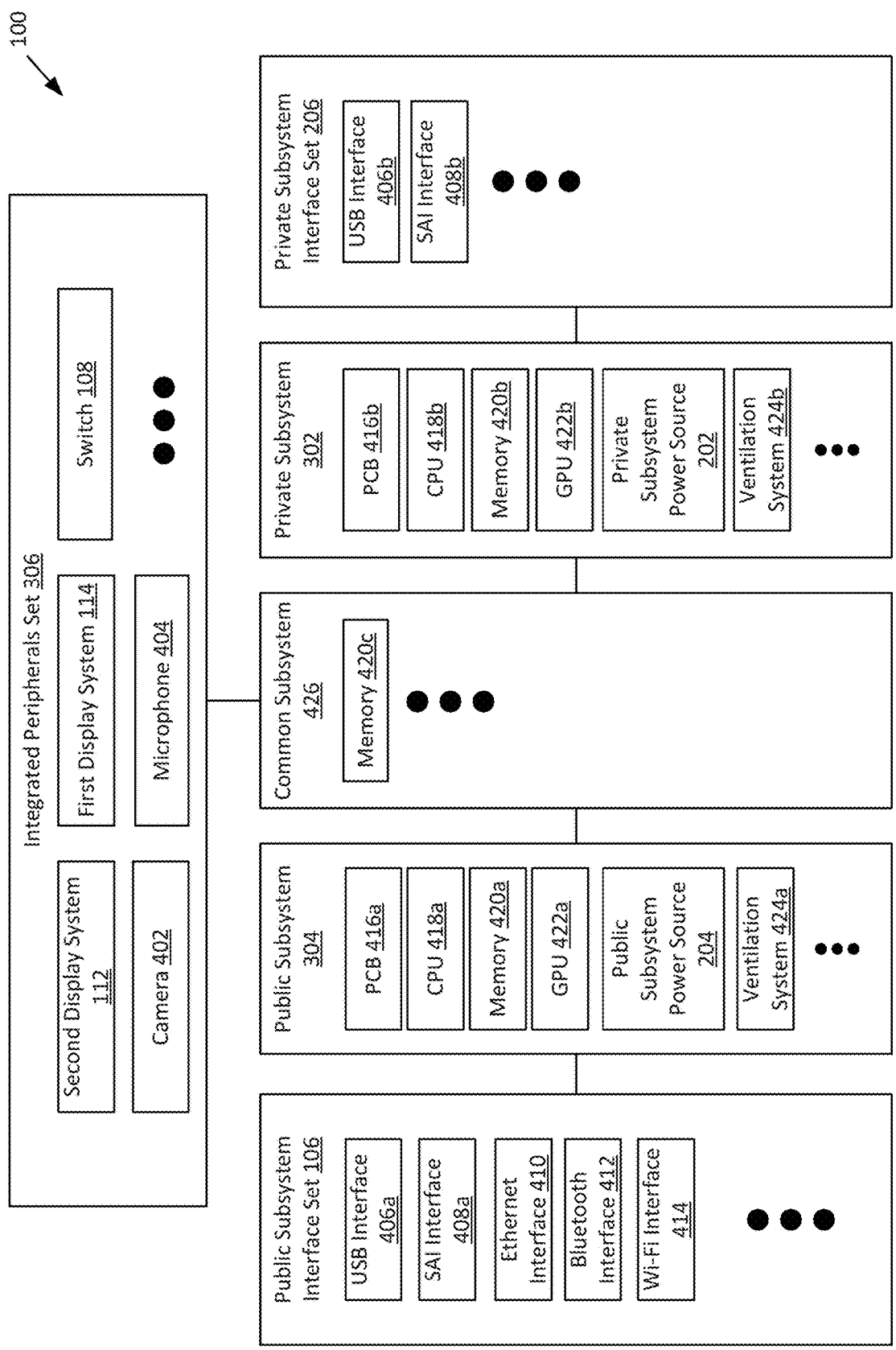
FIG. 4 illustrates an example of a block diagram of a computing system, according to embodiments of the present disclosure.

FIG. 4 illustrates an example of a block diagram of a computing system 100, according to embodiments of the present disclosure. The computing system 100 may include any of the features of the other computing systems described herein (e.g., computing system 100 in FIG. 3). The computing system 100 illustrates how a computing system may be configured and examples of components that may be included in the computing system 100, a private subsystem 302, a public subsystem 304, and/or a common subsystem.

The computing system 100 may include an integrated peripherals set 306, a public subsystem interface set 106, the public subsystem 304, the common subsystem, the private subsystem 302, and a private subsystem interface set 206.

The integrated peripherals set 306 may include any number (e.g., zero or more) of integrated peripherals. Each peripheral in the integrated peripherals set 306 may be integrated into a housing of the computing system 100 and may not be removably-detachable from the computing system 100 (e.g., not removably detachable from the public subsystem interface set 106 or the private subsystem interface set 206). Any of the above-described (integrated and/or non-integrated) peripherals may be included in the integrated peripherals set 306 as an integrated peripheral. For example, the integrated peripherals set 306 may include a first display system 114, a second display system 112, a switch 108, a camera 402, a microphone 404 and/or any number of other integrated peripherals. Some other peripherals that may be included are: a keyboard 110, a touchpad, a fingerprint scanner, etc. The integrated peripherals set 306 may be configured to receive input from a user. The integrated peripherals set 306 may be configured to receive input from any number of other systems and/or devices (e.g., RFID tag). The integrated peripherals set 306 may be configured to output information to users, devices, and/or systems, etc.

For example, the integrated peripherals set 306 may be configured to display information to a user through the use of the second display. The information displayed by the second display may be the same or different information than displayed by the first display.

In an example, the camera 402 or other peripheral (e.g., integrated, non-integrated) is used to determine if a user in view of the camera 402 and is an authenticated user for the use of the private subsystem 302 and/or the public subsystem 304.

The switch 108 may be used to turn the private subsystem 302 ON or OFF. The switch 108 may be used to turn the public subsystem 304 ON or OFF. In certain embodiments, only one of the private subsystem 302 and the public subsystem 304 may be ON at a time and the switch 108 may ensure that only one of the subsystems is on at a given time because the switch 108 can toggle between the private subsystem 302 and the public subsystem 304 being turned ON, while the other is turned OFF.

In certain embodiments, the integrated peripherals set 306 are not the only interfaces that are communicatively coupled with the private subsystem 302 and/or public subsystem 304. Non-integrated peripherals may be communicatively coupled with the private subsystem 302 and/or the public subsystem 304. For example, the USB interface may be used to communicatively couple a non-integrated keyboard peripheral with the public subsystem 304. In certain embodiments, non-integrated peripherals may be communicatively coupled with the private subsystem 302 or public subsystem 304 using a wireless communications interface (e.g., a Bluetooth interface, a Wi-Fi interface, etc.).

The public subsystem interface set 106 may include any number of interfaces (e.g., a USB interface 406a, a SAI interface 408a (e.g., interface 500), an ethernet interface 410, a Wi-Fi interface, a Bluetooth interface 412, etc.). The public subsystem interface set 106 may enable data to be sent to and from the public subsystem 304 (e.g., for storage, relating to user input, etc.) and a component that is connected to an interface of the public subsystem interface set 106. The public interface set may perform functions as described with respect to any of the public subsystem interface sets 106 described herein. Any number of interfaces of a specific interface type may be included in the public subsystem interface set 106. The public subsystem interface set 106 may include a SAI interface 408a. The SAI interface 408a may be interface 500 described with respect to FIG. 5, below.

In certain embodiments, the public subsystem interface set 106 includes an ethernet interface 410 or other network interface (e.g., wired or wireless) to send and/or receive data between the network and the public subsystem 304.

The public subsystem 304 may be included in the computing system 100. The public subsystem 304 may include components that are not shared with the private subsystem 302. The public subsystem 304 can include a printed circuit board (PCB 416a), a central processing unit (CPU 418a), a memory 420a, a graphics processing unit (GPU 422a), the public subsystem power source 204, a ventilation system 424, etc.

Any number of PCB 416a may be included in the public subsystem 304. One or more of the other components of the public subsystem 304 may be mechanically and/or communicatively coupled with the PCB 416a.

Any number of central processing units (CPUs) 418a may be included in the public subsystem 304. The CPU 418a may execute instructions (e.g., instructions stored in memory (e.g., memory 420a)).

Any number of memory 420a may be included in the public subsystem 304. The memory 420a of the public subsystem 304 may store artificial intelligence data, authenticated user data, user data, network data, instructions, etc.

Any number of GPUs 422a may be included in the public subsystem 304. The GPUs 422a may be used to render data, execute instructions, execute artificial intelligence data instructions (e.g., model runtime, model training), etc.

The public subsystem power source 204 may provide power to the public subsystem 304 as described herein.

The ventilation system 424a may ventilate the public subsystem 304. The ventilation system 424a may include water cooling and/or fans, etc.

The common subsystem 426 may include any of the components that the public subsystem 304 and/or private subsystem 302 may include. The common subsystem 426 may include components (e.g., memory 420c) in addition to or as an alternative to those components being included in the public subsystem 304 and/or private subsystem 302. In certain embodiments, one or more components are shared among the private subsystem 302 and the public subsystem 304 to reduce component count compared to including duplicate components in the private subsystem 302 and the public subsystem 304. Reducing the component count can reduce cost, reduce time to manufacture, reduce material required during manufacture, etc.

In certain embodiments, shared memory between the public subsystem 304 and the private subsystem 302 may be useful for booting an operating system from, for storing user information, or other information. The shared memory may be limited to storing a small amount of information (e.g., 1 gigabyte) to reduce the risk of artificial intelligence data or other data from the private subsystem 302 being exposed to the public subsystem 304 and a network that the public subsystem 304 is connected to. The memory (e.g., memory 420a, memory 420c, memory 420b, and/or shared memory) may be random access memory (RAM) and/or long term memory (e.g., solid state memory, hard disk, etc.). In certain embodiments, RAM is included in the common subsystem 426 as the information stored in RAM may be removed from RAM between the private subsystem 302 turning OFF and the public subsystem 304 turning ON, or vice versa.

In certain embodiments, having duplicative components in the private subsystem 302 and public subsystem 304 instead of the common subsystem 426, informational security (confidentiality, availability, and integrity of data) can be enhanced.

The common subsystem 426 may include a PCB. The common subsystem 426 may communicatively couple the public subsystem 304 with one or more integrated peripherals of the integrated peripherals set 306. The common subsystem 426 may communicatively couple the private subsystem 302 with one or more integrated peripherals of the integrated peripherals set 306. The common subsystem 426 may perform functions that control which of the private subsystem 302 and the public subsystem 304 are turned ON at a single point in time.

The private subsystem 302 may include any of the components that the public subsystem 304 may include. For example, the private subsystem 302 may include a PCB 416b, a CPU 418b, a memory 420b, a GPU, a private subsystem 302 power source 202, and/or a ventilation system 424b.

Each of the components may perform similar functions for the private subsystem 302 as already described with respect to the public subsystem 304. The private subsystem 302 may be communicatively coupled to the common subsystem 426. The private subsystem 302 may be communicatively coupled to the private subsystem interface set 206. In certain embodiments, the components (e.g., the memory 420b, the GPU 422b, etc.) of the private subsystem 302 are configured to operate on artificial intelligence data.

The private subsystem interface set 206 may include any number of interfaces (e.g., a USB interface 406b, a SAI interface 408b (e.g., interface 500), an ethernet interface, a Wi-Fi interface, a Bluetooth interface, etc.). In certain embodiments, the private subsystem interface set 206 does not include any interfaces that have network connectivity (e.g., no ethernet interface, no Bluetooth interface, no Wi-Fi interface, etc.). In certain embodiments, the private subsystem interface set 206 includes interfaces for limited network connectivity (e.g., a Bluetooth interface and no Wi-Fi interface).

The private subsystem interface set 206 may enable data to be sent to and from the private subsystem 302 (e.g., for storage, relating to user input, etc.) and a component that is connected to an interface of the private subsystem interface set 206. The private interface set may perform functions as described with respect to any of the private subsystem interface sets 206 described herein. Any number of interfaces of a specific interface type may be included in the private subsystem interface set 206. The private subsystem interface set 206 may include a SAI interface 408b. The SAI interface 408b may be interface 500 described with respect to FIG. 5, below.

In an embodiment, some, none, or all of the firmware, electronics drivers, and related controller electronics for the respective components (e.g., the first display system 114, the second display system 112, the CPU, etc.) may be separately stored in the memory of the private subsystem 302, the public subsystem 304, and/or the common subsystem 426.

In certain embodiments, the public subsystem 304 and the private subsystem 302 will have separate firmware, electronics drivers, and related controller electronics for a respective component than the private subsystem 302 or the public subsystem 304, respectively. In an embodiment, each of the subsystems may include its own audio drivers and/or codec chips to ensure privacy between the subsystems.

One or more faraday cages may enclose one or more components of the public subsystem 304, private subsystem 302, and/or common subsystem 426 (e.g., enclosing at least one of: (i) the CPU(s) 418b of the private subsystem 302, (ii) the memory 420b (or memories) of the private subsystem 302, (iii) the CPU(s) 418a of the public subsystem 304, or (iv) the memory 420a (or memories) of the private subsystem 302). The faraday cage may enhance informational security. The faraday cage may protect the components from external magnetic fields that could gain information from the components and/or augment the data stored and/or processed by the components.

The private subsystem 302, the public subsystem 304, and or the common subsystem 426 may include an airgap. The airgap may be enforced by a non-conductive barrier. Such an air gap may be capable of maintaining electrical and/or physical separation between the private subsystem 302 and the public subsystem 304 to increase the security of the secure computing system 100. The airgap may restrict one or more components from being capable of interfacing with one or more other components.

In certain embodiments, some or all of: the private subsystem 302, the public subsystem 304, and/or the common subsystem 426, may be housed within a thermally insulated compartment for heat management.

In certain embodiments, any combination of subsystems may operate on encrypted data and/or store encrypted data. In an embodiment, any combination of subsystems may perform one or more data encryption techniques.

Figure 5:
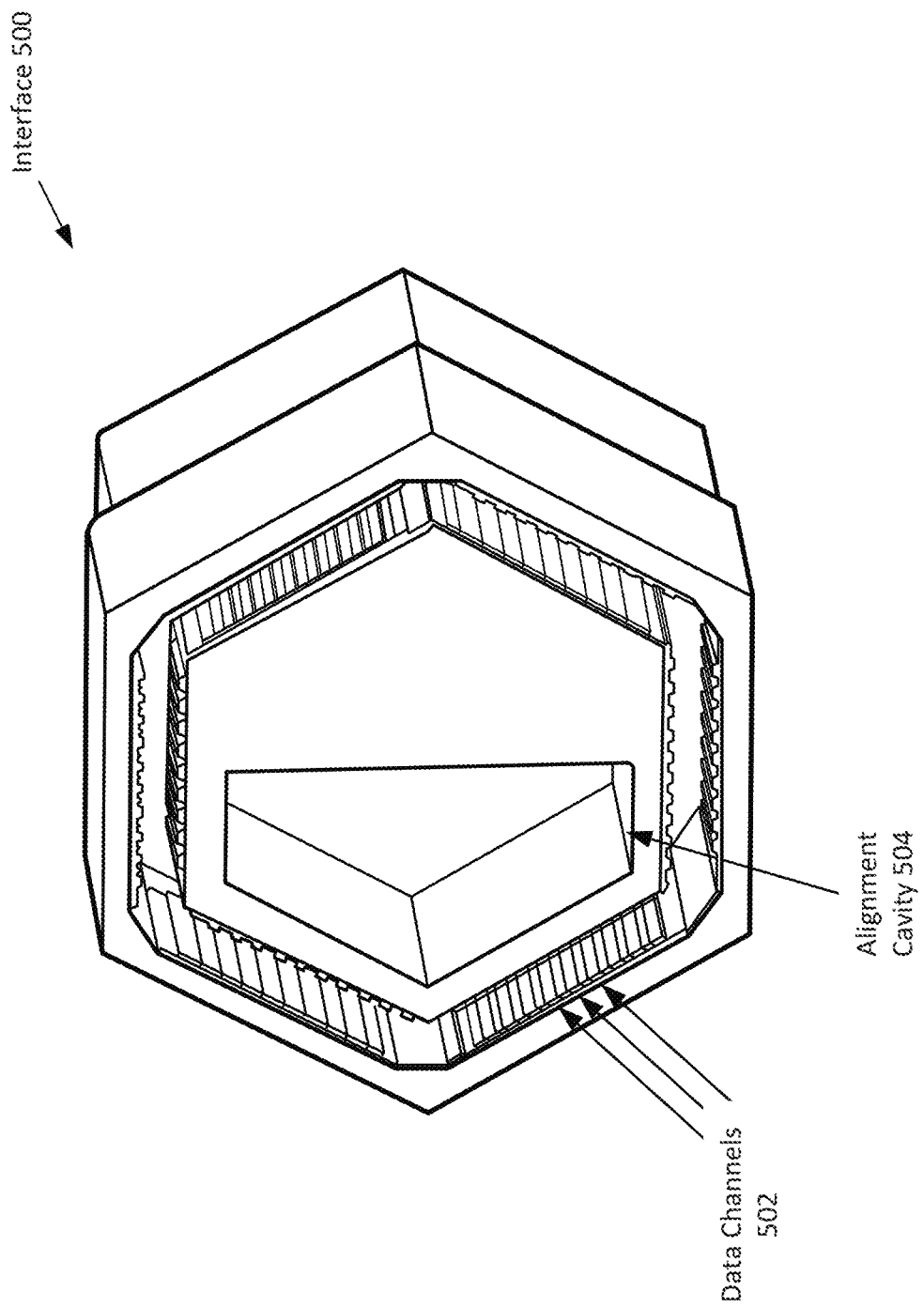
FIG. 5 illustrates an example of an interface that may be included in a computing system, according to embodiments of the present disclosure.

FIG. 5 illustrates an example of an interface 500 that may be included in a computing system 100, according to embodiments of the present disclosure.

One or more of the interface 500 may be included in a public subsystem interface set and/or a private subsystem interface set. The interface 500 may be referred to as a secure artificial intelligence (SAI) interface. The interface 500 may be configured to mechanically couple with a memory storage device interface (e.g., an interface of the memory storage device 600 illustrated in FIG. 6).

In certain embodiments, the interface 500 may be capable of being mechanically coupled with a memory storage device or other device in a manner that is semi orientation agnostic (e.g., the interface 500 may be coupled with another device in one or more orientations). In certain embodiments, the interface 500 may include one or more structures that inform the orientation of alignment when mechanically coupling the interface 500 with another device (e.g., memory storage device). The interface 500 may include one or more cavities or raised areas that define the orientation of a device to be coupled with the interface 500. The interface 500 shape may include one or more sides that define the orientation of a device to be coupled with the interface 500. The interface 500 may have one or more ground connections and one or more power connections.

The interface 500 may be configured to communicatively couple with the memory storage device interface. The interface 500 may include a plurality data channels 502. The data channels 502 may be capable of independently receiving and transmitting data (e.g., artificial intelligence data).

In certain embodiments, the interface 500 may be exclusive to a public subsystem or a private subsystem. In certain embodiments, the interface 500 may be communicatively coupled with only one of the private subsystem and the public subsystem. The interface set of the private subsystem and/or public subsystem may include one or more of the interface 500.

The interface 500 may include a plurality of data channels 502. The plurality of data channels 502 may enable the interface 500 to simultaneously send and receive packets between the interface 500 and a device (e.g., memory storage device). Each of the data channels 502 in the plurality of data channels 502 may be capable of sending and/or receiving information (e.g., a packet) independently of the other data channels 502 in the plurality of data channels 502. For example, a first data channel may transmit a first packet while a second data channel that is different from the first data channel may receive a second packet that is different from the first packet. The plurality of data channels 502 may carry one or more low level ground signals.

In certain embodiments, a data channel of the plurality of data channels 502 is configured to send and receive data, acting as a two way data channel. In certain embodiments, the data channel of the plurality of data channels 502 is configured to be a one-way data channel. In certain embodiments, the data channel of the plurality of data channels 502 is configured to be a two way or a one way data channel by a user, or is predetermined by the memory storage device or the computing system.

In certain embodiments, a first channel of the plurality of data channels 502 is configured to transfer data at a first rate and a second channel of the plurality of data channels 502 is configured to transfer data at a second rate. The first rate and the second rate may be different and the first channel and the second channel may be different channels. The data transfer rate of a data channel may depend on the amount of data to be transferred, may be predetermined (e.g., by the hardware, by the operating system), or may be configured by a user. The data transfer rate of the plurality of channels may depend on whether the channels are two-way channels, how many channels are used for grounding, the speed of memory included in the computing system, and/or the speed of memory included in the memory storage device. In certain embodiments, a channel of the plurality of data channels is configured not to transmit any data unless a condition has been met, such as one or more other channels being used, a predetermined amount of data needing to be transferred, or a desired transfer rate.

In certain embodiments, one or more channels of the plurality of data channels 502 are configured to transmit a certain type of data (e.g., high-confidentiality data). For example, private keys or unencrypted information may be transmitted over a specific subset of the plurality of data channels 502. Determining which subset of channels from the plurality of data channels 502 are configured to transmit certain types of data may be based on user configurations, memory storage device configurations, computing system configurations, etc. Data may be transferred using a subset of the plurality of data channels 502 based on a memory that the data is to be stored in and/or was stored in. For example, a first memory of the data storage device may be communicatively coupled with a first data channel and a second memory of the data storage device may be communicatively coupled with a second data channel.

In certain embodiments, the plurality of data channels 502 includes six or more universal serial bus (USB) channels (e.g., USB type C).

First packet information of a first packet may be dependent on second packet information of a second packet, yet the second packet may be transmitted to and/or from the interface 500 (and the memory storage device) independently of the first packet. The first packet and the second packet may include artificial intelligence data. The first packet and/or the second packet may include encrypted information. Each packet may include header information to reconstruct the first packet information and the second packet information. The packet may include header information to reconstruct the artificial intelligence data independently of an order the packet was received with respect to another packet. For example, even though the first packet may be dependent on the second packet, the first packet may be transmitted over a different data channel and/or at a different time (e.g., before) than the second packet. Packets may include a signature to check whether the packet information (e.g., artificial intelligence data) has been altered during transit. The signature may be used to verify where the packet originated. The signatures may be for unencrypted or encrypted packet information.

Although the interface 500 illustrated has a female connection that may be mechanically coupled with a male connection of another device (e.g., memory storage device), in certain embodiments the interface 500 includes a male connection that may be mechanically coupled with a female connection of another device (e.g., memory storage device)

In certain embodiments, the interface 500 cannot be mechanically coupled to a memory storage device or other device until the user of the private subsystem or public subsystem has been authenticated. The interface 500 may include an actuator to prevent and/or allow the mechanical coupling of the interface 500 with the memory storage device or other device. In certain embodiments, the interface 500 is configured to transmit and/or receive packets after the user has been authenticated by the memory storage device and/or the private subsystem or public subsystem.

Figure 6:
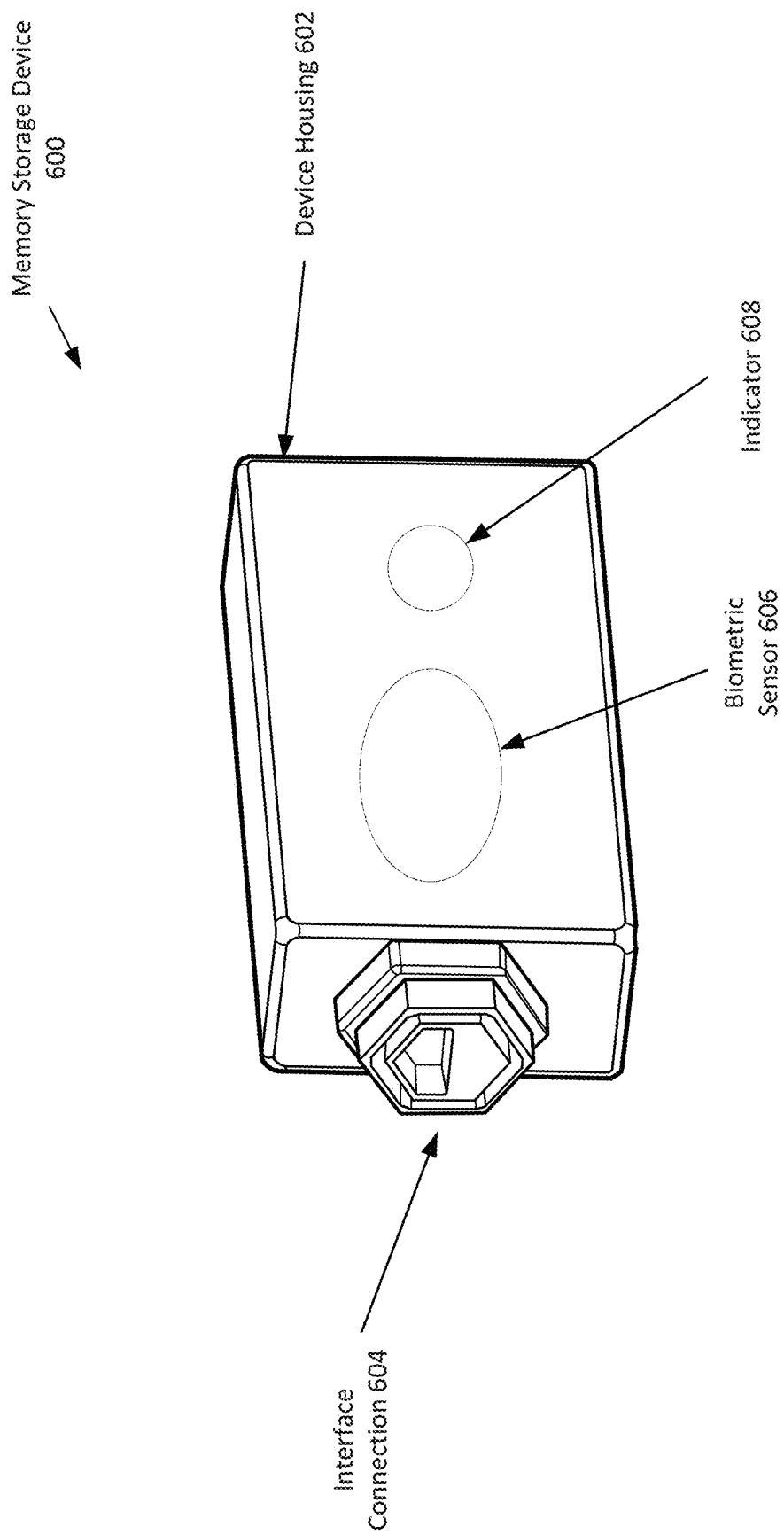
FIG. 6 illustrates an example of a SAI memory storage device, according to embodiments of the present disclosure.

FIG. 6 illustrates an example of a memory storage device 600, according to embodiments of the present disclosure.

The memory storage device 600 may include a device housing 602, an interface connection 604, a biometric sensor 606, and/or an indicator 608.

The housing may be coupled with the interface connection 604 or form the interface connection 604. The device housing 602 may partially enclose the biometric sensor 606 and the indicator 608. The device housing 602 may partially or completely enclose other components such as one or more memory and one or more processors.

The device housing 602 may include and/or form heat dissipation components and/or structures. For example the device housing 602 may form a heat sink. For example, the device housing 602 may include one or more fans.

The memory may store instructions that configure the memory storage device 600 to perform user authentication (e.g., using the biometric sensor 606). The memory may store instructions that configure the memory storage device 600 to send and/or receive (e.g., simultaneously, in sequence) packets to and from an interface (e.g., an interface of a private subsystem or a public subsystem). The memory storage device 600 may be configured to send and/or receive packets based on the user authentication. The packets may include artificial intelligence data. The packets may be as described herein (e.g., with respect to interface 500).

Each of the one or more memory may store packets. Packets may be stored in a first memory of the one or more memory according to a packet size, when a packet was received, the order packets are received, packet security requirements, packet header information, and/or packet contents, memory available in each memory of the one or more memory, etc. The memory may be solid state memory or another form of high bandwidth memory. The memory may be large (e.g., terabytes).

The interface connection 604 may be coupled to and/or formed by the device housing 602. The interface connection 604 may include a male or a female connection. The interface connection 604 may be configured to mechanically couple with an interface, such as interface 500. The interface connection 604 may include a plurality (e.g., two or more) of data channels that may send and receive a packet independently of one another. The plurality of data channels may function in a similar manner to the plurality of data channels described with respect to interface 500. The plurality of data channels of the interface connection 604 of the memory storage device 600 may be configured to be communicatively coupled with the plurality of data channels of the interface 500. The interface connection 604 may include one or more power connections and one or more ground connections. The interface connection 604 of the memory storage device 600 may be mechanically coupled with only one of a private subsystem and a public subsystem at a single time. The memory storage device 600 may be communicatively coupled with only one of a private subsystem and a public subsystem at a single time.

In certain embodiments, the memory storage device 600 may be communicatively coupled with a private subsystem or a public subsystem irrespective of being mechanically coupled with the subsystem. For example, a relatively small amount of data (e.g., less than a gigabyte) may be transmitted between the memory storage device 600 and the private subsystem or public subsystem through a wireless connection (e.g., Bluetooth). The wireless connection between the public subsystem or private subsystem and the memory storage device 600 may be used to send and/or receive authentication data, status indicator data, and/or other data.

In certain embodiments, the interface connection 604 may include one or more structures that inform the orientation of alignment (e.g., alignment cavity 504) when mechanically coupling the interface connection 604 with an interface (e.g., an interface of a private subsystem or a public subsystem). The interface connection 604 may include one or more cavities or raised areas that define the orientation of a coupling between the interface connection 604 of the memory storage device 600 and the interface.

The biometric sensor 606 may include a sensor capable of obtaining biometric measurement(s). For example, the biometric sensor 606 may include an iris scanner, a fingerprint scanner, or another biometric scanner that one of ordinary skill in the art with the benefit of the present disclosure would find obvious. The biometric scanner may be configured to obtain biometric measurements so that the biometric measurements may be compared with one or more stored biometric measurements.

The memory storage device 600 may store one or more biometric measurements (e.g., in the one or more memory). The stored biometric measurements may be stored in an encrypted or unencrypted format. The one or more biometric measurements may be used to determine (e.g., via comparison) whether a user of the memory storage device 600 is an authenticated user according to the stored one or more biometric measurements. In certain embodiments, the one or more biometric measurements are stored in memory of the private subsystem and/or public subsystem. In certain embodiments, the stored biometric measurements may be transmitted to/from the private subsystem or public subsystem from/to the memory storage device 600.

In certain embodiments, one or more users may be authenticated to use the memory storage device 600. In certain embodiments, the memory storage device 600 is configured to locally process the measurements obtained by the biometric sensor 606 to determine if a user of the memory storage device 600 is an authenticated user. In certain embodiments, the biometric measurements obtained by the biometric sensor 606 of the memory storage device 600 is transmitted to the private subsystem or public subsystem to authenticate the user. In certain embodiments, the user of the private subsystem, the public subsystem, and/or the memory storage device 600 may be authenticated using the memory storage device 600. In certain embodiments, the user of the memory storage device 600 may be authenticated using the private subsystem, the public subsystem, and/or the memory storage device 600.

For example, the memory storage device 600 may authenticate a user to determine whether the user authenticated by the memory storage device 600 is the same user that has been authenticated with the private subsystem. In an example, authentication of the user is performed by the private subsystem or public subsystem whether or not the biometric data was obtained by the private subsystem, the public subsystem, or the memory storage device 600 because the authentication data may be stored on the private subsystem or the public subsystem rather than the memory storage device 600 to increase data confidentiality and integrity.

In certain embodiments, the memory storage device 600 cannot be mechanically coupled to an interface until the user of the memory storage device 600 has been authenticated. The memory storage device 600 may include an actuator to prevent and/or allow the mechanical coupling of the memory storage device 600 with the interface. In certain embodiments, the memory storage device 600 is configured to transmit and/or receive packets after the user has been authenticated by the memory storage device 600 and/or the private subsystem or public subsystem.

The biometric sensor 606 may be one or a plurality of biometric sensors included in the memory storage device 600. One of ordinary skill in the art with the benefit of the present disclosure would recognize that the biometric sensor (s) 606 may be disposed one any surface of the memory storage device 600 and in any orientation.

The indicator 608 may be one of a plurality of indicators included in the memory storage device 600. The indicator 608 may cause indications via a light (e.g., a light emitting diode (LED), a sound, haptics, and/or a display, etc.). The indicator 608 may indicate binary indications (e.g., low or high, ON or OFF, authenticated or not authenticated, etc.)

and/or varying indications (e.g., battery level of 10%, 20%, 50%, 80%, data transfer 88% complete, etc.).

The indicator 608 may indicate various information such as battery level of the memory storage device 600 (e.g., low, full, 50%, etc.), storage capacity of the memory storage device 600, storage capacity of the private subsystems or public subsystem, whether a user of the memory storage device 600 has been authenticated, which user of the memory storage device 600 has been authenticated, data characteristics (e.g., metadata) of data stored on the memory storage device 600, private subsystems the memory storage device 600 may be used with, whether the memory storage device 600 is receiving and/or sending data, and/or data transfer speed, etc.

The indicator 608 may be one or a plurality of indicators included in the memory storage device 600. One of ordinary skill in the art with the benefit of the present disclosure would recognize that the indicator(s) 608 may be disposed on any surface of the memory storage device 600 and in any orientation.

In certain embodiments, the computing system includes at least one indicator that performs functions in a similar manner to the indicator 608 of the memory storage device 600. The indicator may present indications using sound, light, and/or haptics, etc.

In an embodiment, one or more public subsystems may transfer data (e.g., send and/or receive) between one or more private subsystems simultaneously. In an embodiment, a private subsystem or a public subsystem may transfer data (e.g., send and/or receive) between the respective subsystem and one or more memory storage devices 600 simultaneously.

Where there is a many-to-one private subsystem-to-public subsystem, or vice versa, relationship, the configuration may be a cost effective and/or resource effective measure for users of such public subsystems and/or private subsystems.

Figure 7:
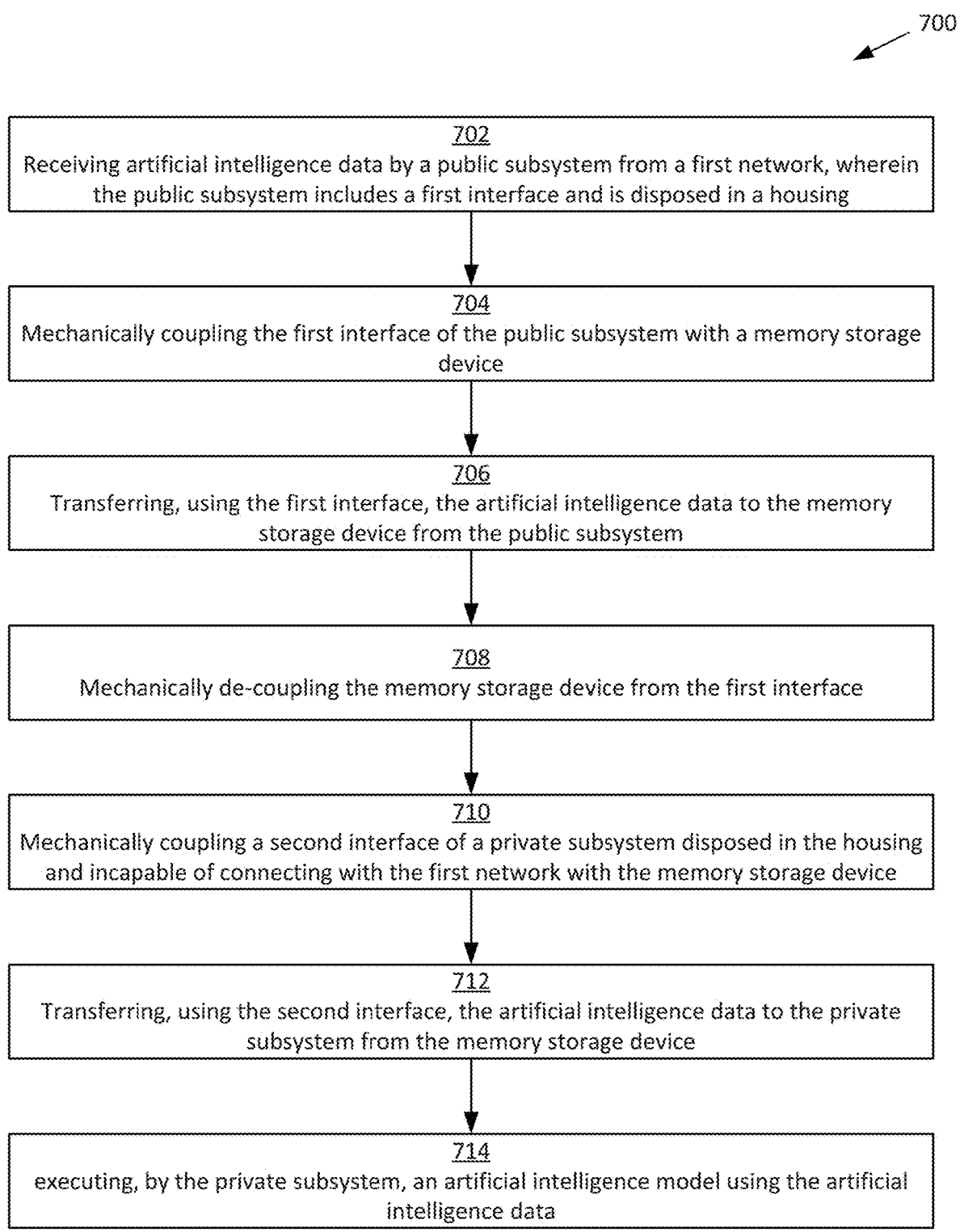
FIG. 7 illustrates an example of a process for using a computing system, according to embodiments of the present disclosure.

FIG. 7 illustrates an example of a process for using a computing system, according to embodiments of the present disclosure. The computing system may be the computing system 100. Process 700 includes transferring artificial intelligence data from a public subsystem to a private subsystem using a memory storage device. For example, the artificial intelligence data may use the artificial intelligence data to train an artificial intelligence model (or perform another artificial intelligence operations) in an environment more secure (e.g., more data confidentiality, integrity, and/or availability measures) relative to the public subsystem.

At 702, artificial intelligence data may be received by a public subsystem. The artificial intelligence data may include data used for artificial intelligence tasks such as training and generating output. The artificial intelligence data may include images, documents, classifications, and/or labels, etc.

The artificial intelligence data may be received from a first network. The first network may include a network such as a local area network or a wide area network. The public subsystem may receive the artificial intelligence data from the first network via an interface (e.g., a USB interface 406a, an ethernet interface 410, a Wi-Fi interface 414, etc.).

Artificial intelligence data received via an interface may be stored in memory of the public subsystem. The memory of the public subsystem and how the memory may be shared between one or more other subsystems (e.g., other public subsystems, a common subsystem, a private subsystem, etc.) has been described herein.

The public subsystem may include a first interface. The first interface may include a SAI interface 500. The first interface may be capable of being mechanically and communicatively coupled with a memory storage device (e.g., memory storage device 600). The first interface may be disposed in a housing. The first interface may be one of the interfaces included in the public subsystem interface set 106. The first interface may be disposed in a housing of the computing system and configured to interconnect the private subsystem and the public subsystem. The first interface may be communicatively coupled to the public subsystem.

At 704, the first interface of the public subsystem may be mechanically coupled with a memory storage device (e.g., memory storage device 600). For example, a male end of the memory storage device may be plugged into a female end of the first interface. By mechanically coupling the first interface with the memory storage device, a first communicative coupling may be established between the first interface and the memory storage device. In certain embodiments, the first interface is exclusively communicatively coupled with the public subsystem.

In certain embodiments, a second communicative coupling is established (e.g., additionally) between the memory storage device and another interface. The interface may be an interface of the private subsystem, the public subsystem, or the common subsystem of the computing system. The second communicative coupling may include a wireless coupling and has been described above in further detail.

At 706, using the first interface, artificial intelligence data may be transferred to the memory of the storage device from the public subsystem. Artificial intelligence data stored in memory accessible to the public subsystem may be transferred from the public subsystem to the memory storage device using the first interface after a mechanical and/or communicative coupling has been established between the first interface and the memory storage device.

An indicator (e.g., peripheral) of the computing system may indicate when data is being transferred to and/or from the computing system (e.g., to and/or from the public subsystem, to and/or from the private subsystem).

At 708, the memory storage device may be mechanically de-coupled from the first interface. De-coupling the memory storage device from the first interface may terminate the first communicative coupling between the first interface and the memory storage device.

In certain embodiments, the second communicative coupling may remain established after the memory storage device is mechanically de-coupled from the first interface (e.g., until the public subsystem is put into an OFF state).

At 710, a second interface of a private subsystem may be mechanically coupled with the memory storage device. Step 710 may be performed after the public subsystem has been put into a powered OFF state and the private subsystem has been put into a powered ON state. In certain embodiments, only one of the private subsystem and the public subsystem may be in a powered ON state at a single point in time.

The second interface may be a different interface than the first interface. The second interface of the private subsystem may be disposed in the housing. For example, a male end of the memory storage device may be plugged into a female end of the second interface. By mechanically coupling the second interface with the memory storage device, a third communicative coupling may be established between the second interface and the memory storage device. In certain embodiments, the second interface is exclusively communicatively coupled with the public subsystem.

The private subsystem may be incapable of connecting with the first network. The private subsystem may be incapable of establishing a Wi-Fi, Bluetooth, ethernet, and/ or any other type of network connection. In certain embodiments, the private subsystem may establish network connections with devices on an allow-list (e.g., peripherals, the memory storage device). In certain embodiments, the private subsystem may only have a Bluetooth interface and/or another low bandwidth interface to use for establishing network connections.

In certain embodiments, a fourth communicative coupling is established (e.g., additionally) between the memory storage device and another interface. The interface may be an interface included in the private subsystem, the public subsystem, or the common subsystem of the computing system. The fourth communicative coupling may include a wireless coupling and has been described above in further detail.

At 712, artificial intelligence data may be transferred, using the second interface, to the private subsystem from the memory storage device (e.g., using the third communicative coupling). The artificial intelligence data may be stored in memory of the private subsystem and/or a common subsystem of the computer system.

In certain embodiments, before data (e.g., artificial intelligence data) is transferred from the memory storage device to the private subsystem (e.g., using the second interface), a user of the computer system is authenticated. The user may be authenticated by entering credentials into the computing system and/or by the computing system obtaining biometric data from the user, etc. (e.g., using one or more peripherals of the computing system, receiving biometric data from the memory storage device). In certain embodiments, before data is sent and/or received to/from memory storage device (e.g., via the second interface or the first interface), authentication (e.g., using peripheral(s), using the memory storage device) is performed. Determining whether authentication is successful may be performed by the private subsystem, public subsystem, common subsystem, and/or memory storage device.

At 714, the private subsystem may execute an artificial intelligence model using the artificial intelligence data. The artificial intelligence model may include a model executed locally on the private subsystem. The artificial intelligence model may include any form of machine learning model capable of running on the private subsystem. The artificial intelligence data may be used to train the artificial intelligence model. The artificial intelligence data may be used as input to the artificial intelligence model to generate output. The artificial intelligence data may be used to further train the artificial intelligence model.

A similar process as described with respect to 704-712 may be performed for transferring data from the private subsystem to the public subsystem using the memory storage device.

Figure 8:
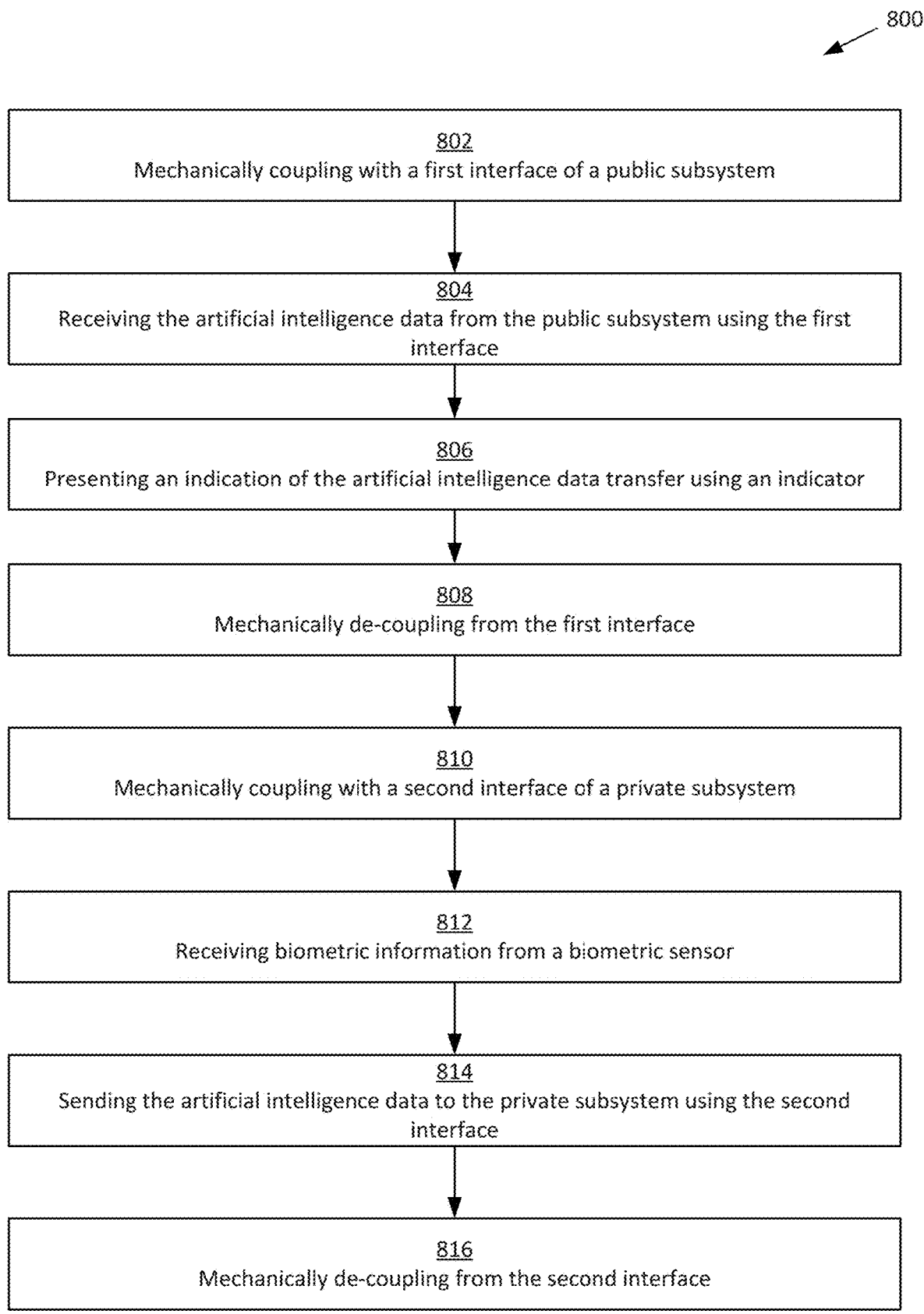
FIG. 8 illustrates an example of using a secure storage device, according to embodiments of the present disclosure.

FIG. 8 illustrates an example of using a memory storage device (e.g., memory storage device 600), according to embodiments of the present disclosure. Process 800 illustrates transferring artificial intelligence data from a public subsystem to a private subsystem using a memory storage device. Process 800 may be performed by the memory storage device while process 700 is performed by the computing system (e.g., computing system 100).

At 802, the memory storage device may be mechanically coupled with a first interface of the public subsystem. In certain embodiments, the first interface is coupled to a common subsystem or a private subsystem.

In certain embodiments, before the memory storage device is capable of being coupled with the first interface, authentication may be performed by the memory storage device or the computing system (e.g., the public subsystem). The authentication may be performed as described above (e.g., using peripherals, using a biometric sensor included in the memory storage device, etc.). Once authentication has been performed, an actuator of the memory storage device and/or the computing system may move positions and enable the memory storage device and the first interface to be mechanically coupled.

At 804, artificial intelligence data may be transferred to the memory storage device from the public subsystem using the first interface. The artificial intelligence data may be transferred to the memory storage device in packets. The packets may be sent over a plurality of data channels. The data channels may send and receive data independently from the other data channels in the plurality of data channels. A first subset of the plurality of data channels may transmit data to and from a first memory of the memory storage device and a second subset, independent from the first subset, of data channels of the plurality of data channels may transmit data to and from a second memory of the memory storage device that is separate from the first memory of the memory storage device. The artificial intelligence data transferred to the memory storage device may remain encrypted, in packets, and/or unconstructed (e.g., not constructed according to packet headers) while stored in the memory storage device.

In certain embodiments, a first data channel may be used to transmit data (e.g., packet acknowledgments, artificial intelligence data, packet information, etc.) from the computing system to the memory storage device while a second data channel is used to transmit data (e.g., packet acknowledgments, artificial intelligence data, packet information, etc.) from the memory storage device to the computing system (e.g., simultaneously).

At 806, an indication may be presented. The indication may relate to the artificial intelligence data transfer. The indication may indicate that a data transfer is taking place to and/or from the memory storage device. The indication may indicate how much data is stored on the memory storage device, how much available memory space the memory storage device has, whether a user has been authenticated, data transfer speed, etc. The indicator may be included in the memory storage device and/or be included in the computing system.

At 808, the memory storage device may be mechanically de-coupled from the first interface. For example, the user may unplug the memory storage device from the second interface of the computing system. In certain embodiments, after de-coupling occurs, the memory storage device may not be capable of mechanically and/or communicatively coupling with a computing system until authentication has occurred (e.g., by the memory storage device and/or the computing system).

At 810, the memory storage device may be mechanically coupled with a second interface of the private subsystem. For example, the user may plug the memory storage device into the computer system (e.g., private subsystem). In certain embodiments, the second interface is coupled to the common subsystem or the private subsystem.

In certain embodiments, before the memory storage device is capable of being coupled with the second interface, authentication may be performed by the memory storage device or the computing system (e.g., the private subsystem). The authentication may be performed as described above (e.g., using peripherals, using a biometric sensor included in the memory storage device, etc.). Once authentication has been performed, an actuator of the memory storage device and/or the computing system may move positions and enable the memory storage device and the second interface to be mechanically coupled.

At 812, biometric information may be received from a biometric sensor. The biometric sensor may be included in the memory storage device and/or the computing system. The biometric sensor may be used in the process of authenticating a user. Authentication may occur periodically, before data (e.g., artificial intelligence data) transfers, before data transfers to a private subsystem, before mechanical coupling of the memory storage device and the computing system, or at another point in time. The biometric information may be received by the computing system and/or the memory storage device after the biometric information has been obtained by at least one of the memory storage device and the computing system.

At 814, the artificial intelligence data may be sent to the private subsystem from the memory storage device using the second interface. The artificial intelligence data sent to the private subsystem may be encrypted and/or may be included in packets. The packets may include header information capable of reconstructing the data from the form it was transmitted in to the form that it was in before transmitted and/or a form that the data is useful in. For example, the data included in a first packet may include data that is reliant on a second packet but the first packet may be received by the private subsystem from the memory storage device before the second packet is. Thus, the header information of the first packet and the second packet can inform the private subsystem how to reconstruct the artificial intelligence data that has been included in the first packet and the second packet. Decrypting the artificial intelligence data may be reliant on the biometric information or another method of authentication.

At 816, the memory storage device may be mechanically de-coupled from the second interface. For example, the memory storage device may be unplugged from the second interface.

A similar process may be performed for transferring data from the private subsystem to the public subsystem using the memory storage device.

Figure 9:
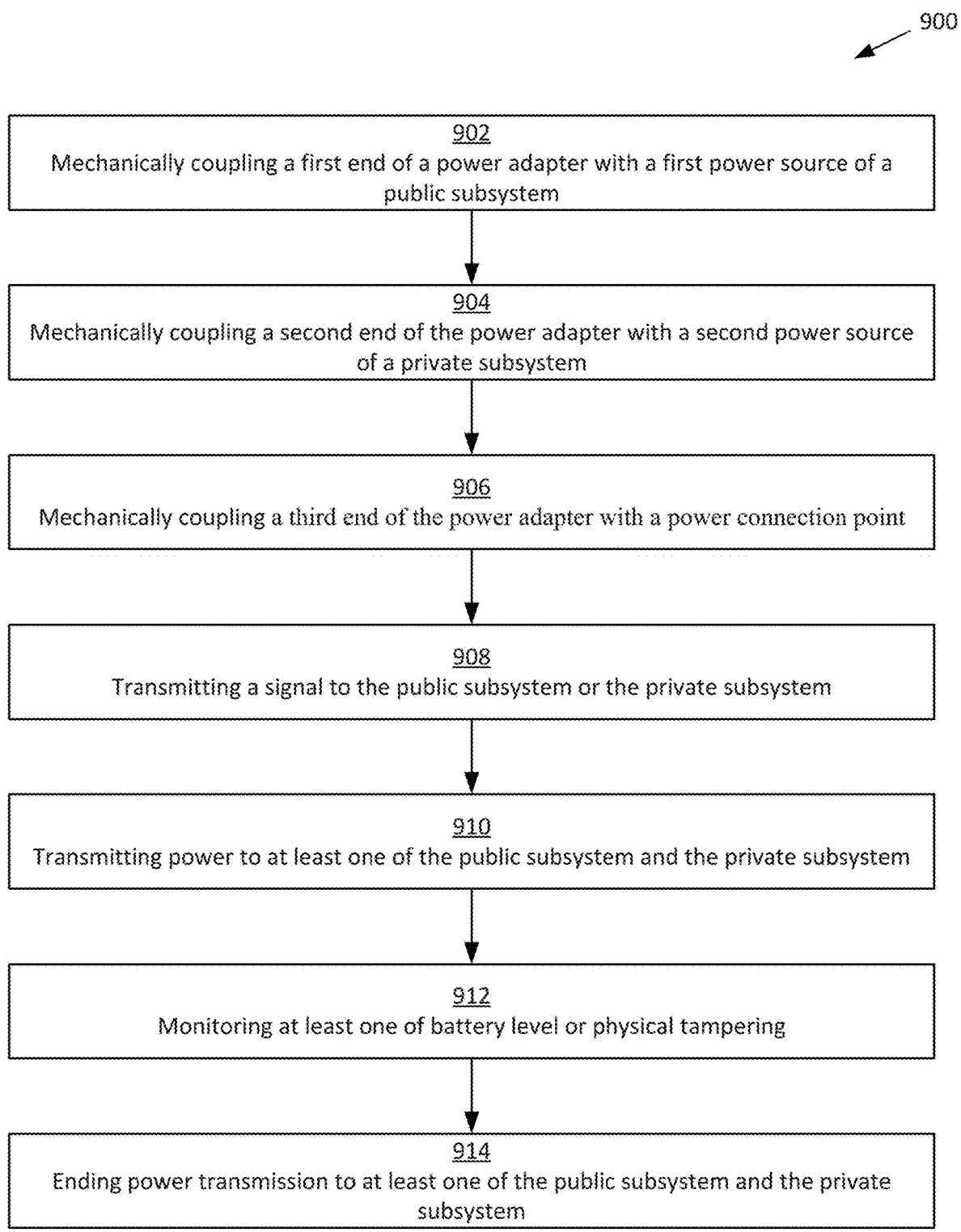
FIG. 9 illustrates an example process of using a power adapter, according to embodiments of the present disclosure.

FIG. 9 illustrates an example process of using a power adapter, according to embodiments of the present disclosure. The power adapter may be the power adapter described in any of the embodiments herein (e.g., power adapter 104). The power adapter may be external or internal to a computing system (e.g., computing system 100) and may provide power to a private subsystem and/or public subsystem.

At 902, a first end of the power adapter may be mechanically coupled with a first power source of the public subsystem. For example, the first end of the power adapter may be plugged into the first power source (e.g., by a user, fixed during manufacturing process).

The first power source may be included in the computing system. The first power source may include a battery included in the public subsystem. In certain embodiments, the first power source is included in the public subsystem and the private subsystem because they share a power source. The first power source may be capable of causing power from the power adapter to pass through to components of the public subsystem instead of being stored (e.g., in a battery).

At 904, a second end of the power adapter may mechanically couple with a second power source of the private subsystem. For example, the second end of the power adapter may be plugged into the second power source (e.g., by a user, fixed).

The second power source may be included in the computing system. The second power source may include a battery included in the private subsystem. In certain embodiments, the second power source is not included in the private subsystem because the private subsystem and the public subsystem share the first power source. The second power source may be capable of causing power from the power adapter to pass through to components of the public subsystem instead of being stored (e.g., in a battery).

At 906, a third end of the power adapter may be mechanically coupled with a power connection point (e.g., power connection point 102). For example, the third end of the power adapter may be plugged into the power connection point (e.g., by a user, fixed). The power connection point may include a wall outlet, a battery, a car outlet, and/or another source of power.

At 908, the power adapter may transmit a signal to at least one of a private subsystem or public subsystem. The signal may be transmitted in response to the power source being tampered, heating up, being plugged in (e.g., to a power source, to a power connection point), etc. The signal may include information such as an identifier related to the power adapter (e.g., unique identifier, manufacturer identifier, identifier paired with the computing system, etc.). The signal may be used by the computing system to determine whether power will be accepted from the power adapter and/or if a user should be notified (e.g., via a peripheral of the computing system) about information relating to the power adapter. In certain embodiments, the signal is wirelessly sent to the computing system or a subsystem thereof (e.g., using RFID). In certain embodiments, the signal is sent via a wired connection (e.g., via the first end or the second end of the power adapter) to the computing system or a subsystem thereof.

At 910, the power adapter may transmit power to at least one of the public subsystem or the private subsystem. The power may be transmitted based on a signal received from the computing system. The power may be transmitted to at least one of the private subsystem and the public subsystem. The power transmission may be based a battery level of the private subsystem and/or the public subsystem. The power transmission may be based on whether the private subsystem or the public subsystem is currently in a powered ON state. The power transmission may charge a battery of the computing system and/or directly power the computing system.

At 912, the power adapter may monitor battery level and/or whether physical tampering has occurred. The power adapter may include components capable of detecting whether tampering with the power adapter has occurred. The power adapter may include a component capable of receiving a signal from the computing system (e.g., the private subsystem, the public subsystem) that indicates the power level of one or more batteries of the computing system, whether the private subsystem or the public subsystem is in a powered ON state, etc. The signal may be transmitted wirelessly and/or via wired connection (e.g., via the first end or the second end). The power adapter may transmit a signal based on the monitoring.

At 914, the power adapter may end power transmission to at least one of the private subsystem or the public subsystem. The power adapter may end transmission based on the monitoring performed at 912. For example, if the power adapter has detected tempering with the power adapter, the power adapter may not transmit power and/or data to the computing system or a subsystem thereof (e.g., the private subsystem). In an example, if the power adapter has detected that the public subsystem is above a certain threshold of battery, the power adapter may reduce or end transmission of power to the public subsystem and may instead power the private subsystem. The power adapter may power the public subsystem and the private subsystem. The power adapter may determine whether to start powering and/or stop powering the private subsystem and the public subsystem independently of one another.

Figure 10:
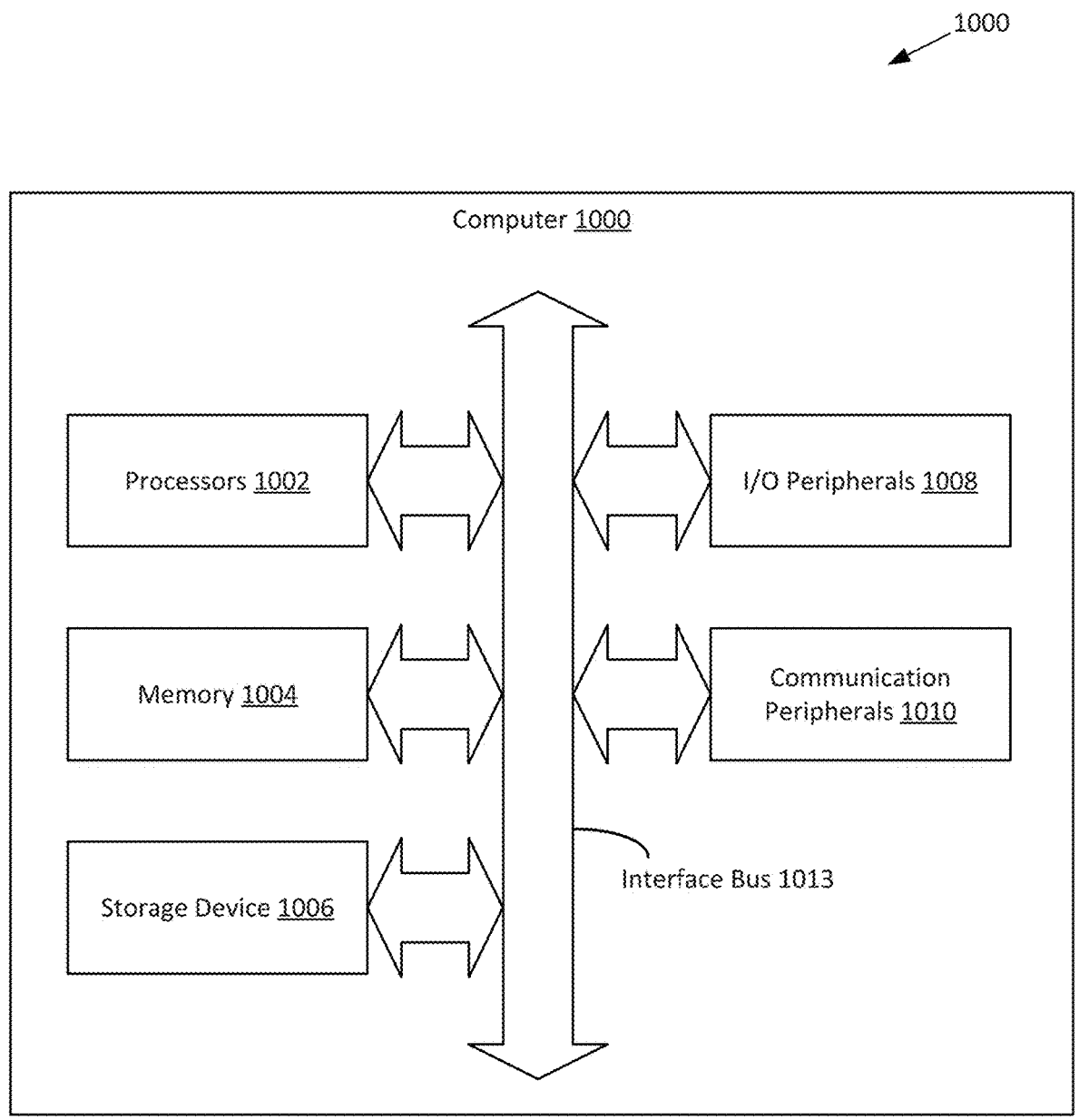
FIG. 10 illustrates an example of an architecture of a computer, according to embodiments of the present disclosure.

FIG. 10 illustrates an example of an architecture of a computer 1000, according to embodiments of the present disclosure. The computer 1000 may be representative of a computing system (e.g., computing system 100), a private subsystem (e.g., private subsystem 302), a public subsystem (e.g., public subsystem 304), a common subsystem (e.g., common subsystem 426), and/or a memory storage device (e.g., memory storage device 600).

The computer 1000 includes at least processors 1002, a memory 1004, a storage device 1006, input/output peripherals (I/O) 1008, communication peripherals 1010, and an interface bus 1012. The interface bus 1012 is configured to communicate, transmit, and transfer data, controls, and commands among the various components of the computer 1000. The memory 1004 and the storage device 1006 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 1004 and the storage device 1006 also include computer readable signal media. A computer readable signal medium includes a propagated data signal with computer readable program code embodied therein. Such a propagated signal takes any of a variety of forms including, but not limited to, electric, optical, or any combination thereof. A computer readable signal medium includes any computer readable medium that is not a computer readable storage medium and that can communicate, propagate, or transport a program for use in connection with the computer 1000.

Further, the memory 1004 includes an operating system, programs, and applications. The processors 1002 can include a controller. At least one of the processors 1002 is configured to execute the stored instructions and includes, for example, a logical processing unit, a microprocessor, a digital signal processor, and other processors. The I/O peripherals 1008 include user interfaces, such as a keyboard, screen (e.g., an electrophoretic panel with a panel controller), microphone, speaker, other input/output devices, and computing components, such as graphical processing units, serial ports, parallel ports, universal serial buses, and other input/output peripherals. The I/O peripherals 1008 are connected to the processor 1002 through any of the ports coupled to the interface bus 1012. The communication peripherals 910 are configured to facilitate communication between the computer 1000 and other computers over a communication network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computer, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computer can include any suitable arrangement of components that provide a result conditioned on one or more inputs. Suitable computers include multipurpose microprocessor-based computing devices accessing stored software that programs or configures the portable device from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computer.

Embodiments of the methods disclosed herein may be performed in the operation of such computers. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computing system comprising:
    a display;
    a housing;
    a public subsystem disposed in the housing and comprising a first processor set of processors and a first memory set of memories storing first instructions for a first operating system;
    a private subsystem disposed in the housing and comprising a second processor set of processors and a second memory set of memories storing second instructions for a second operating system;
    a first interface disposed in the housing configured to interconnect the private subsystem and the public subsystem and communicatively coupled with the public subsystem; and
    a second interface disposed in the housing configured to interconnect the private subsystem and the public subsystem and communicatively coupled with the private subsystem;
    wherein:
        the public subsystem is configured to present information on the display and connect with a network, and
        the private subsystem is configured to present information on the display and is isolated such that it is incapable of connecting with the network, and is configured to receive, from the public subsystem via the second interface, artificial intelligence data and execute, locally by the second processor set, an artificial intelligence model based on the artificial intelligence data.

2. The computing system of claim 1, wherein the private subsystem is configured to train the artificial intelligence model using the artificial intelligence data.

3. The computing system of claim 1, wherein the private subsystem is configured to use the artificial intelligence model included in the artificial intelligence data to generate an output.

4. The computing system of claim 1, wherein the private subsystem is in a powered ON state when the public subsystem is in a powered OFF state, and wherein the public subsystem is in a powered ON state when the private subsystem is in a powered OFF state.

5. The computing system of claim 1, wherein the private subsystem further comprises:
    a faraday cage enclosing at least one of: (i) the second processor set, (ii) the first memory set, (iii) the first processor set, or (iv) the second memory set.

6. The computing system of claim 1, further comprising:
    a power adapter common to the private subsystem and the public subsystem and configured to selectively supply power to the private subsystem and the public subsystem such that only one of the private subsystem or the public subsystem receives power at a time.

7. The computing system of claim 6, further comprising:
    a first power source included in the public subsystem; and
    a second power source included in the private subsystem and different than the first power source;
    and wherein the power adapter further comprises:
        a first end configured to be coupled with the first power source;
        a second end configured to be coupled with the second power source; and
        a third end configured to be coupled with a power source other than the second power source and the first power source.

8. The computing system of claim 6, wherein the power adapter further comprises:
    a switch configured to prevent tampering, wherein an activation of the switch causes the power adapter to become inoperable.

9. The computing system of claim 6, wherein the power adapter further comprises:
    a transmitter configured to transmit an authentication signal, wherein the authentication signal is based on at least one of: (i) a manufacturer of the power adapter or (ii) an identifier of the power adapter.

10. The computing system of claim 1, further comprising:
    a memory storage device configured to transfer the artificial intelligence data between the public subsystem and the private subsystem via the first interface and the second interface, the memory storage device configured to be communicatively coupled with one of: (i) the first interface and (ii) the second interface at a time.

11. The computing system of claim 10, wherein the memory storage device comprises:
    two or more data channels that may send and receive a packet independently of one another;
    a third processor set of processors; and
    a third memory set of memories storing third instructions, that configure the memory storage device to:
        perform a user authentication; and
        based on the user authentication, simultaneously send and receive the packet to and from the first interface or the second interface, the packet including the artificial intelligence data.

12. The computing system of claim 11, wherein the packet includes header information to reconstruct the artificial intelligence data independently of an order the packet was received with respect to another packet, and wherein the packet includes a signature to check whether the artificial intelligence data has been altered.

13. The computing system of claim 1, wherein the second interface includes a memory storage device interface including a plurality of data channels capable of independently receiving and transmitting artificial intelligence data from a memory storage device.

14. The computing system of claim 13, wherein the plurality of data channels includes six or more universal serial bus (USB) channels.

15. A method comprising:
receiving artificial intelligence data by a public subsystem from a network, wherein the public subsystem includes a first interface and is disposed in a housing;
transferring, using the first interface, the artificial intelligence data to a memory storage device from the public subsystem;
transferring, using a second interface of a private subsystem disposed in the housing and incapable of connecting with the network, the artificial intelligence data to the private subsystem from the memory storage device; and
executing, by the private subsystem, an artificial intelligence model using the artificial intelligence data.

16. The method of claim 15, further comprising:
mechanically coupling the first interface of the public subsystem with the memory storage device;
mechanically de-coupling the memory storage device from the first interface; and
mechanically coupling the second interface with the memory storage device.

17. The method of claim 15, further comprising:
training, by the private subsystem, the artificial intelligence model using the artificial intelligence data.

18. The method of claim 15, wherein the artificial intelligence data includes the artificial intelligence model, and the method further comprises:
generating, by the private subsystem, an output based on the artificial intelligence model.

19. The method of claim 15, further comprising:
powering OFF the public subsystem before transferring the artificial intelligence data to the private subsystem; and
powering ON the private subsystem after transferring the artificial intelligence data to the memory storage device from the public subsystem.

20. The method of claim 15, further comprising:
receiving an authentication signal from a power adapter;
authenticating the power adapter using the authentication signal; and
receiving power from the power adapter.

21. The method of claim 20, further comprising:
receiving power from one of: (i) a first end of the power adapter or (ii) a second end of the power adapter based at least on (i) first power and first usage information of the public subsystem and (ii) second power and second usage information of the private subsystem.

22. A device comprising:
a public subsystem comprising a first processor set of processors and a first memory set of memories storing first instructions for a first operating system;
a private subsystem comprising a second processor set of processors and a second memory set of memories storing second instructions for a second operating system;
a first interface configured to interconnect the private subsystem and the public subsystem and communicatively coupled with the public subsystem; and
a second interface configured to interconnect the private subsystem and the public subsystem and communicatively coupled with the private subsystem;
wherein:
the public subsystem is configured to present information on a display and connect with a network, and
the private subsystem is configured to present information on the display and is isolated such that it is incapable of connecting with the network, and is configured to receive, from the public subsystem via the second interface, artificial intelligence data and execute, locally by the second processor set, an artificial intelligence model based on the artificial intelligence data.

* * * * *